US010848576B2

United States Patent
Stammers et al.

(10) Patent No.: US 10,848,576 B2
(45) Date of Patent: Nov. 24, 2020

(54) NETWORK FUNCTION (NF) REPOSITORY FUNCTION (NRF) HAVING AN INTERFACE WITH A SEGMENT ROUTING PATH COMPUTATION ENTITY (SR-PCE) FOR IMPROVED DISCOVERY AND SELECTION OF NF INSTANCES

(71) Applicant: Cisco Technology, Inc., San Jose, CA (US)

(72) Inventors: Timothy Peter Stammers, Raleigh, NC (US); Robert Glenn Smith, Voisins le Bretonneux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 86 days.

(21) Appl. No.: 16/173,681

(22) Filed: Oct. 29, 2018

(65) Prior Publication Data
US 2020/0137174 A1 Apr. 30, 2020

(51) Int. Cl.
*G06F 15/16* (2006.01)
*H04L 29/08* (2006.01)

(52) U.S. Cl.
CPC .................... *H04L 67/16* (2013.01)

(58) Field of Classification Search
USPC ........................................................ 709/230
See application file for complete search history.

(56) References Cited

U.S. PATENT DOCUMENTS

| | | | |
|---|---|---|---|
| 6,765,881 B1 * | 7/2004 | Rajakarunanayake | ...................... H04L 12/4641 370/254 |
| 8,839,409 B2 * | 9/2014 | Cheriton | ............. H04L 63/0272 726/15 |
| 9,049,233 B2 * | 6/2015 | Frost | ....................... H04L 45/26 |
| 9,178,801 B1 | 11/2015 | Guichard et al. | |
| 9,369,303 B2 * | 6/2016 | Diwane | ................... H04L 49/35 |
| 9,503,363 B2 | 11/2016 | Sivabalan et al. | |
| 10,038,997 B2 * | 7/2018 | Kelly | .................... H04L 67/303 |
| 10,142,994 B2 * | 11/2018 | Lee | ........................ H04W 12/08 |

(Continued)

FOREIGN PATENT DOCUMENTS

WO 2018067780 A1 4/2018

OTHER PUBLICATIONS

Sgambelluri et al., SDN and PCE Implementations for Segment Routing, Jun. 30-Jul. 2, 2015, IEEE, 2015 20th European Conference on Networks and Optical Communications—(NOC), pp. 1-4. (Year: 2015).*

(Continued)

*Primary Examiner* — Alicia Baturay

(57) ABSTRACT

A network function (NF) repository function (NRF) suitable for use in a 5G mobile network utilizing segment routing (SR) is described. The first interface of the NRF may be an $N_{nrf}$ interface with a service discovery function. The second interface of the NRF may be for use with a SR path information obtaining function for interfacing with a SR path computation entity (SR-PCE). The service discovery function may be further configured to discover NF instances based on identifying an NF instance being associated with SR path information that accords to least one service, application, or subscription requirement obtained according to the discovery request.

20 Claims, 22 Drawing Sheets

(56) References Cited

U.S. PATENT DOCUMENTS

| | | | | |
|---|---|---|---|---|
| 10,581,984 B2* | 3/2020 | Livanos | ............... | H04W 48/18 |
| 10,638,415 B2* | 4/2020 | Baek | ............... | H04W 48/06 |
| 10,708,824 B2* | 7/2020 | Lee | ............... | H04W 36/0016 |
| 2014/0063822 A1 | 3/2014 | Sasaki et al. | | |
| 2017/0026417 A1 | 1/2017 | Ermagan et al. | | |
| 2017/0064749 A1 | 3/2017 | Jain et al. | | |
| 2017/0332421 A1* | 11/2017 | Sternberg | ............... | H04W 12/0609 |
| 2017/0346718 A1 | 11/2017 | Psenak et al. | | |
| 2018/0124175 A1* | 5/2018 | Li | ............... | G06F 16/27 |
| 2018/0139107 A1* | 5/2018 | Senarath | ............... | H04L 41/5003 |
| 2018/0192390 A1 | 7/2018 | Li et al. | | |
| 2018/0227871 A1 | 8/2018 | Singh et al. | | |
| 2018/0270743 A1* | 9/2018 | Callard | ............... | H04L 45/50 |
| 2018/0359795 A1* | 12/2018 | Baek | ............... | H04W 76/15 |
| 2018/0367402 A1 | 12/2018 | Harneja et al. | | |
| 2019/0190818 A1 | 6/2019 | Ceccarelli et al. | | |
| 2019/0191467 A1 | 6/2019 | Dao et al. | | |
| 2019/0268383 A1 | 8/2019 | Maino et al. | | |
| 2019/0306251 A1 | 10/2019 | Talebi Fard et al. | | |

OTHER PUBLICATIONS

Arashmid Akhavain, SRV6 As Data Plane for 3GPP N9 Interface, IETF 101, London, Mar. 2018, pp. 1-24.

Bogineni et al., "Optimized Mobile User Plane Solutions for 5G", Internet Draft of Internet Engineering Task Force (IETF), Mar. 5, 2018, pp. 1-40.

Matsushima, et al., "Segment Routing IPv6 for Mobile User Plane", DMM Working Group, Internet Draft of Internet Engineering Task Force (IETF), Jul. 2, 2018, pp. 1-26.

Satoru Matsushima, "Reducing the complexity of 5G networks using Segment Routing IPv6," APNIC Blog, Mar. 7, 2018, pp. 1-6, available at https://blog.apnic.net/2018/03/07/reducing-complexity-5g-networks-using-segment-routing-pv6/.

International Search Report and Written Opinion in counterpart International Application No. PCT/US2019/057344, dated Jan. 30, 2020, 21 pages.

SoftBank Corp., "Pseudo-CR on SRv6 Impact for 5GC", 3GPP TSG CT WG4 Meeting #86-bis, C4-187226, Oct. 15-19, 2018, 2 pages.

SoftBank Corp., "Pseudo-CR on SRv6 Impact on SMF", 3GPP TSG CT WG4 Meeting #86-bis, C4-187225, Oct. 15-19, 2018, 2 pages.

3GPP Organizational Partners, "3rd Generation Partnership Project; Technical Specification Group Core Network and Terminals; Study on User Plane Protocol in 5GC. (Release 16)", 3GPP TR 29.892 V0.3.0, Oct. 2018, 20 pages.

K. Bogineni et al., "Optimized Mobile User Plane Solutions for 5G", draft-bogineni-dmm-optimized-mobile-user-plane-01, dmm, Internet-Draft, Intended status: Informational, Jun. 29, 2018, 65 pages.

Kim et al., "Spring Use Cases for Mobile Network", Network Working Group of Internet Draft for Internet Engineering Task Force (IETF), Oct. 31, 2016, pp. 1-12.

International Search Report and Written Opinion in counterpart International Application No. PCT/US2019/054431, dated Feb. 7, 2020, 15 pages.

Farrel, Adrian et al., "Segment Routing: Cutting Through the hype and finding the IETF's Innivative Nugget of Gold", https://www.ietfjournal.org/segment-routing-cutting-through-the-hype-and-finding-the-ietfs-innovative-nugget-of-gold/ IETF Journal, Jul. 5, 2017, 32 pages.

Rodriguez, Eric et al., "5G, Mobile Backhaul and Fronthaul Evolution", Nov. 6-9, 2017, 51 pages.

Shah, Vipul et al., "Automated Networks with Segment Routing in the Datacenter", BRKDCN-2050, Jun. 10-14, 2018, 56 pages.

Nasrallah, Ahmed et al., "Ultra-Low Latency (ULL) Networks: The IEEE TSN and IETF DetNet Standards and Related 5G ULL Research", arXiv:1803.07673v3 [cs.NI], Sep. 24, 2018, 59 pages.

5G Americas, "The Evolution of Security in 5G", Oct. 2018, 41 pages.

Kuklinski, Slawomir et al., "D2.3: Initial report on the overall system architecture definition", Final version v1.0, Jun. 30, 2017, 118 pages.

* cited by examiner

FIG. 10 e.g. 5G Candidate Pairs = AMF ↔ SMF
e.g. 5G Candidate Pairs = gNB ↔ UPF

| Candidate Pairs of NF Instance / Nodes for Session Communication 1002 | | Segment Route (SR) Path Identifier 1008 | Segment ID (SID) or SID List Associated with SR Path 1010 | Set of Segment Route (SR) Path Policy Parameters Associated with SR Path 1012 |
|---|---|---|---|---|
| NF Instance / Node (NF Type 1) Identifier or Address 1004 | NF Instance / Node (NF Type 2) Identifier or Address 1006 | | | |
| NF Node Add1 | NF Node Add2 | SR1-2a | SID1-2a / SID List 1-2a | P1-2a1, P1-2a2, P1-2a3, ... |
|  |  | SR1-2b | SID1-2b / SID List 1-2b | P1-2b1, P1-2b2, P1-2b3, ... |
|  |  | SR1-2c | SID1-2c / SID List 1-2c | P1-2c1, P1-2c2, P1-2c3, ... |
| ... | ... | ... | ... | ... |
| NF Node Add1 | NF Node Add3 | SR1-3a | SID1-3a / SID List 1-3a | P1-3a1, P1-3a2, P1-3a3, ... |
|  |  | SR1-3b | SID1-3b / SID List 1-3b | P1-3b1, P1-3b2, P1-3b3, ... |
|  |  | SR1-3c | SID1-3c / SID List 1-3c | P1-3c1, P1-3c2, P1-3c3, ... |
| ... | ... | ... | ... | ... |
| NF Node Add1 | NF Node Add4 | SR1-4a | SID5-4a / SID List 1-4a | P1-4a1, P1-4a2, P5-4a3, ... |
|  |  | SR1-4b | SID5-4b / SID List 1-4b | P1-4b1, P1-4b2, P5-4b3, ... |
|  |  | SR1-4c | SID5-4c / SID List 1-4c | P1-4c1, P1-4c2, P5-4c3, ... |
| ... | ... | ... | ... | ... |
| NF Node Add5 | NF Node Add2 | SR1-2a | SID5-2a / SID List 5-2a | P5-2a1, P5-2a2, P5-2a3, ... |
|  |  | SR1-3a | SID5-3b / SID List 5-3b | P5-3a1, P5-3a2, P5-3b3, ... |
|  |  | SR1-3c | SID5-3c / SID List 5-3c | P5-3c1, P5-3c2, P5-3c3, ... |
| ... | ... | ... | ... | ... |
| NF Node Add5 | NF Node Add3 | SR1-3a | SID5-3a / SID List 5-3a | P5-3a1, P5-3a2, P5-3a3, ... |
|  |  | SR1-3b | SID5-3b / SID List 5-3b | P5-3b1, P5-3b2, P5-3b3, ... |
|  |  | SR1-3c | SID5-3c / SID List 5-3c | P5-3c1, P5-3c2, P5-3c3, ... |
| ... | ... | ... | ... | ... |
| NF Node Add9 | NF Node Add2 | SR1-2a | SID9-2a / SID List 9-2a | P9-2a1, P9-2a2, P9-2a3, ... |
|  |  | SR1-2b | SID9-2b / SID List 9-2b | P9-2b1, P9-2b2, P9-2b3, ... |
|  |  | SR1-2c | SID9-2c / SID List 9-2c | P9-2c1, P9-2c2, P9-2c3, ... |
| ... | ... | ... | ... | ... |

| Segment Route (SR) Path Identifier ~1102 | Segment ID (SID) or SID List of SR Path ~1104 | Set of Segment Route (SR) Path Policy Parameters ~1006 ||||
|---|---|---|---|---|---|
| | | Operational Status (OS) of SR Path ~1112 | Latency (L) of SR Path ~1114 | Residency (R) of SR Path ~1116 | Bandwidth (BW) of SR Path ~1118 |
| SR1-2a | SID1-2a / SID List | OS1-2a | L1-2a | R1-2a | BW1-2a |
| SR1-2b | SID1-2b / SID List | OS1-2b | L1-2b | R1-2b | BW1-2b |
| SR1-2c | SID1-2c / SID List | OS1-2c | L1-2c | R1-2c | BW1-2c |
| ... | ... | ... | ... | ... | ... |
| SR1-3a | SID1-3a / SID List | OS1-3a | L1-3a | R1-3a | BW1-3a |
| SR1-3b | SID1-3b / SID List | OS1-3b | L1-3b | R1-3b | BW1-3b |
| SR1-3c | SID1-3c / SID List | OS1-3c | L1-3c | R1-3c | BW1-3c |
| ... | ... | ... | ... | ... | ... |
| SR1-4a | SID5-4a / SID List | OS1-4a | L1-4a | R1-4a | BW1-4a |
| SR1-4b | SID5-4b / SID List | OS1-4b | L1-4b | R1-4b | BW1-4b |
| SR1-4c | SID5-4c / SID List | OS1-4c | L1-4c | R1-4c | BW1-4c |
| ... | ... | ... | ... | ... | ... |
| SR1-2a | SID5-2a / SID List | OS5-2a | L5-2a | R5-2a | BW5-2a |
| SR1-2b | SID5-2b / SID List | OS5-2b | L5-2b | R5-2b | BW5-2b |
| SR1-2c | SID5-2c / SID List | OS5-2c | L5-2c | R5-2c | BW5-2c |
| ... | ... | ... | ... | ... | ... |
| SR1-3a | SID5-3a / SID List | OS5-3a | L5-3a | R5-3a | BW5-3a |
| SR1-3b | SID5-3b / SID List | OS5-3b | L5-3b | R5-3b | BW5-3b |
| SR1-3c | SID5-3c / SID List | OS5-3c | L5-3c | R5-3c | BW5-3c |
| ... | ... | ... | ... | ... | ... |
| SR1-2a | SID9-2a / SID List | OS9-2a | L9-2a | R9-2a | BW9-2a |
| SR1-2b | SID9-2b / SID List | OS9-2b | L9-2b | R9-2b | BW9-2b |
| SR1-2c | SID9-2c / SID List | OS9-2c | L9-2c | R9-2c | BW9-2c |

NETWORK FUNCTION (NF) REPOSITORY FUNCTION (NRF) HAVING AN INTERFACE WITH A SEGMENT ROUTING PATH COMPUTATION ENTITY (SR-PCE) FOR IMPROVED DISCOVERY AND SELECTION OF NF INSTANCES

TECHNICAL FIELD

The present disclosure relates generally to mobile networks and segment routing (SR), and more particularly to a network function (NF) repository function (NRF) having an interface with a segment routing path computation entity (SR-PCE) suitable for improved discovery and selection of NF instances for use in sessions for user equipment (UE).

BACKGROUND

In a 5G mobile network, there is a need to easily provide and facilitate the communication of segment routing (SR) path information of SR paths available in relation network function (NFs) instances or nodes. It would be desirable for such available information to facilitate a more appropriate and efficient use of network resources in the mobile network. Such features may further be for use in providing a more improved discovery and selection of NF instances for use in session communications for user equipment (UE).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 10 is a table which provides SR path information associated with each SR path of a plurality of SR paths between different pairs of NF instances/nodes;

FIG. 11 is a table which provides the SR path information associated with each SR path of the plurality of SR paths indicated in FIG. 10.

Figure 1A:
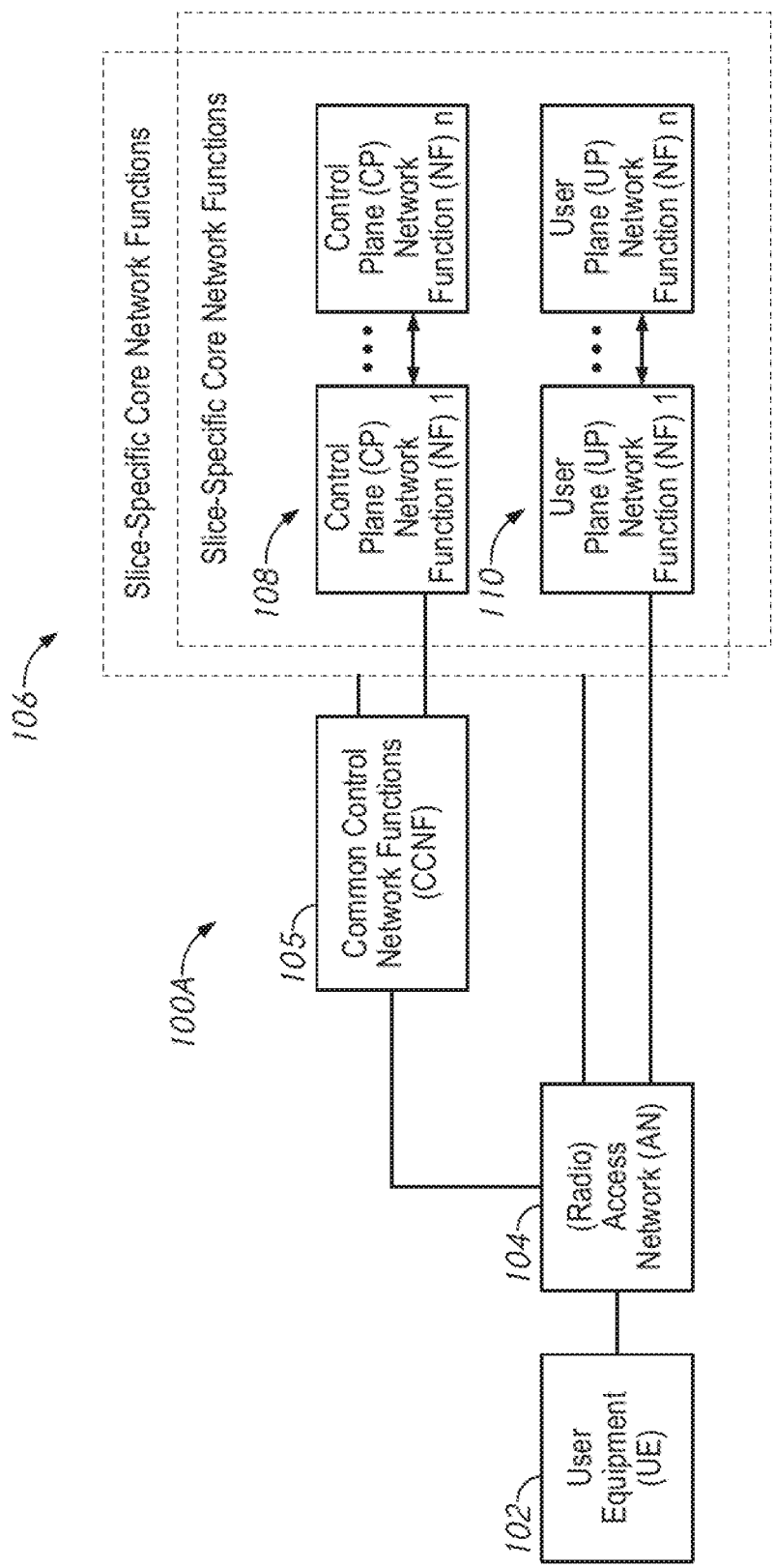
FIG. 1A is an illustrative representation of a basic network architecture of a Fifth Generation (5G) mobile network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

In one illustrative example, a network function (NF) repository function (NRF) suitable for use in a 5G mobile network utilizing segment routing (SR) is provided. The NRF may have a first interface and a second interface. The first interface maybe an $N_{nrf}$ interface of a service discovery function configured to receive a discovery request from an NF, discover one or more NF instances based on at least one of a service, application, or subscription requirement obtained according to the discovery request, and respond to the discovery request with the one or more discovered NF instances. The second interface may be of a SR path information obtaining function for interfacing with a SR path computation entity (SR-PCE). The SR path information obtaining function may be configured to receive SR path information associated with an SR path of at least some of a plurality of SR paths between different pairs of NF instances or nodes which are candidate pairs for session communication, and store the SR path information of each SR path in association with at least one of the NF instances of the respective candidate pair. The service discovery function may be configured to respond to the discovery request with SR path information (e.g. a SID or SID list) associated with a discovered NF instance. In addition, or as an alternative, the service discovery function may be configured to discover one or more NF instances based on identifying an NF instance associated with SR path information (e.g. a calculated parameter of the SR path) that accords to least one of a service, application, or subscription requirement obtained according to the discovery request.

More detailed and alternative techniques and implementations are provided herein as will be described below.

EXAMPLE EMBODIMENTS

FIG. 1A is an illustrative representation of a network architecture 100a of a 5G mobile network configured to facilitate communications for user equipment (UE) 102. In general, network architecture 100a includes common control network functions (CCNF) 105 and a plurality of slice-specific core network functions 106. UE 102 may obtain access to the mobile network via an access network (AN) 104, which may be a radio access network (RAN). In the present disclosure, the UEs operating in the 5G mobile network may be any suitable type of devices, such as cellular telephones, smart phones, tablet devices, Internet of Things (IoT) devices, and machine-to-machine (M2M) communication devices, to name but a few.

CCNF 105 includes a plurality of network functions (NFs) which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of common functionalities provided by CCNF 105.

Slice-specific core network functions of network slices 106 are separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
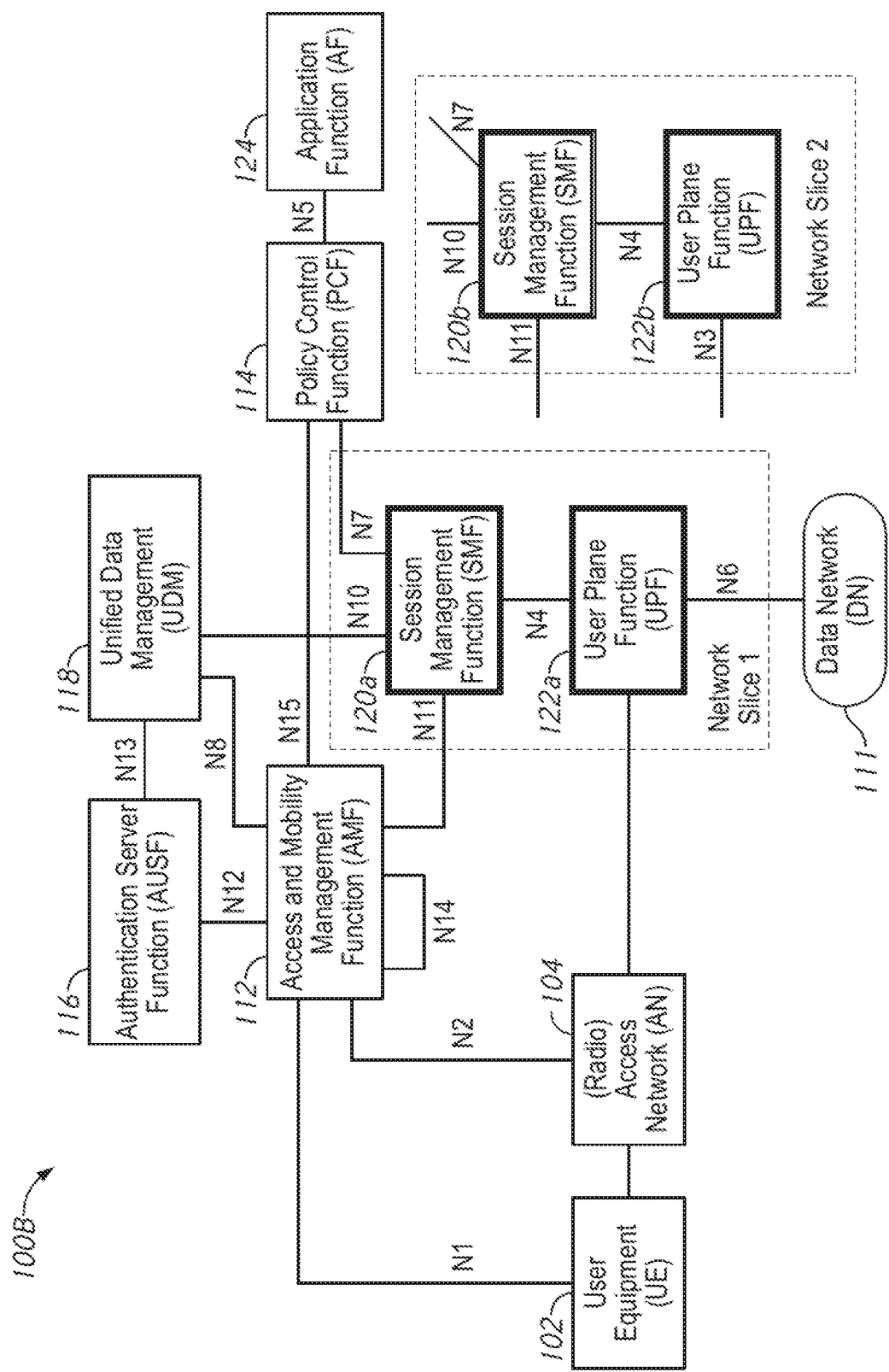
FIG. 1B is an illustrative representation of a more detailed network architecture of the mobile network of FIG. 1A.

FIG. 1B is an illustrative representation of a more detailed network architecture 100b of the 5G mobile network of FIG. 1A. As provided in 3GPP standards for 5G (e.g. 3GPP 23.501 and 23.502), network architecture 100b for the 5G mobile network may include an authentication server function (AUSF) 116, a unified data management (UDM) 118 (having a unified data repository or UDR), an AMF 112, a policy control function (PCF) 114, an SMF 120a, and a UPF 122a. A plurality of interfaces or reference points N1 through N15 shown in FIG. 1B may define the communications and/or protocols between each of the entities, as described in the relevant (evolving) standards documents. One or more application functions, such as an application function (AF) 124, may connect to the 5G mobile network via PCF 114. One or more data networks (DN) 111 having application servers (AS) may be connected to the 5G mobile network through UPFs such as UPF 122a.

UPF 122a is part of the user plane and all other NFs (i.e. AMF 112, SMF 120a, PCF 114, AUSF 116, and UDM 118) are part of the control plane. Separating user and control planes guarantees that each plane resource to be scaled independently. It also allows UPFs to be deployed separately from CP functions in a distributed fashion. The NFs in the CP are modularized functions; for example, AMF and SMF are independent functions allowing for independent evolution and scaling. As specifically illustrated in FIG. 1B, NFs such as SMF 120a and UPF 122a of FIG. 1B may be provided as specific instances in a first network slice (e.g. network slice 1). Additional instances of NFs for additional network slices may be provided as well, as illustrated by SMF 120b and UPF 122b provided as additional specific instances in a second network slice (e.g. network slice 2).

Figure 1C:
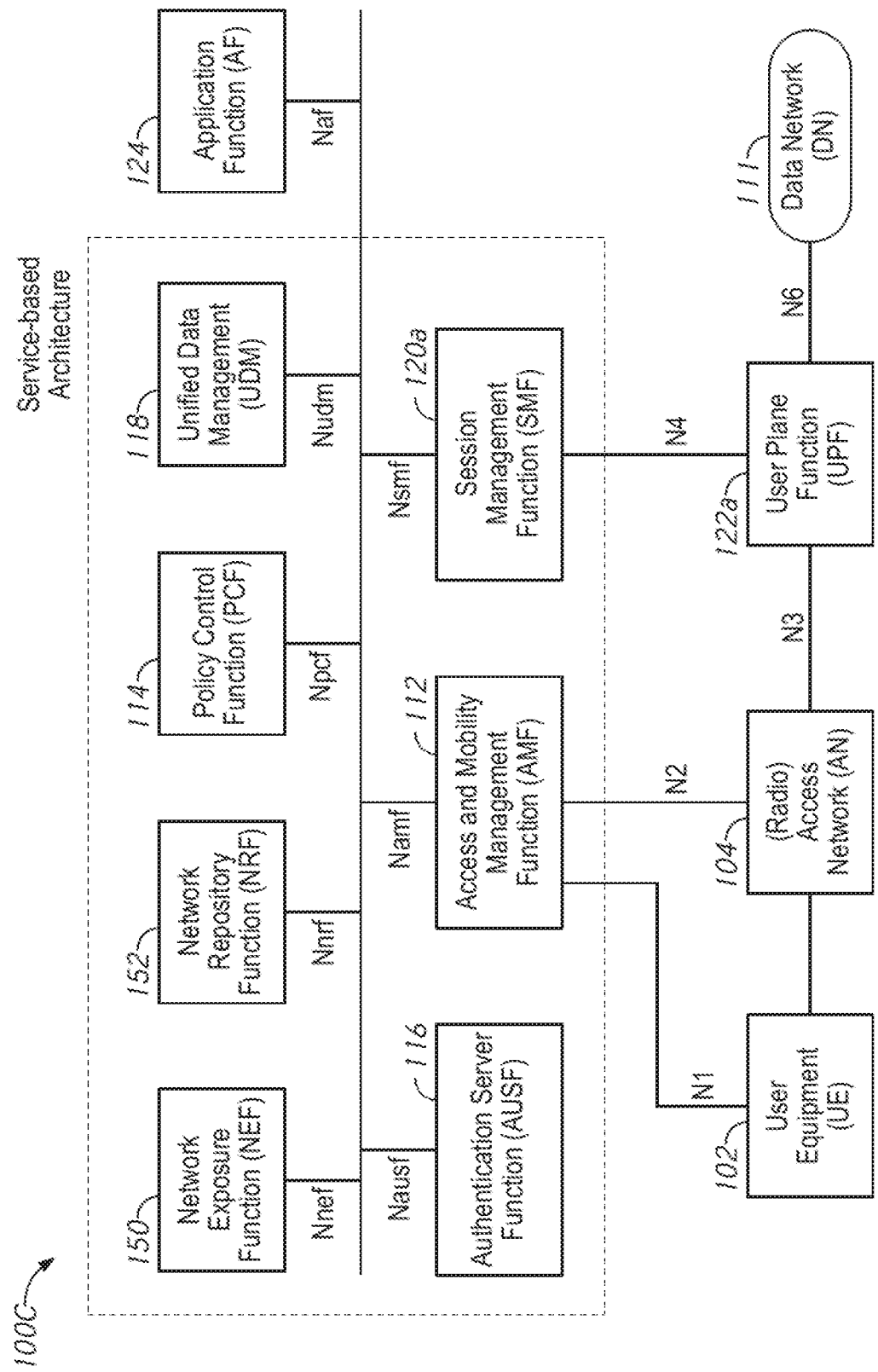
FIG. 1C is an illustrative representation of the mobile network as a service-based architecture of FIGS. 1A-1B.

In FIG. 1C, a service-based architecture 100C of the 5G mobile network of FIGS. 1A-1B is illustrated. Network node functions in the service-based architecture 100C of FIG. 1C, not shown in FIGS. 1A-1B, include a network exposure function (NEF) entity 150 and an NF repository function (NRF) 152. A plurality of interfaces N1 through N6, as well as interfaces $N_{nef}$, $N_{nrf}$, $N_{pcf}$, $N_{udm}$, $N_{ausf}$, $N_{amf}$, $N_{smf}$ and $N_{af}$, may define the communications and/or protocols between each of the entities, as described in the relevant (evolving) standards.

In the present disclosure, network elements in the mobile network may make use of segment routing (SR) for communications, including session communications, in relation to the defined interfaces/reference points. The segment routing (SR) may be SR for IPv6 (SRv6). To illustrate a few SRv6 examples, FIGS. 2A-2D are block diagrams of network nodes which are configured to route packets using SRv6.

Figure 2A:
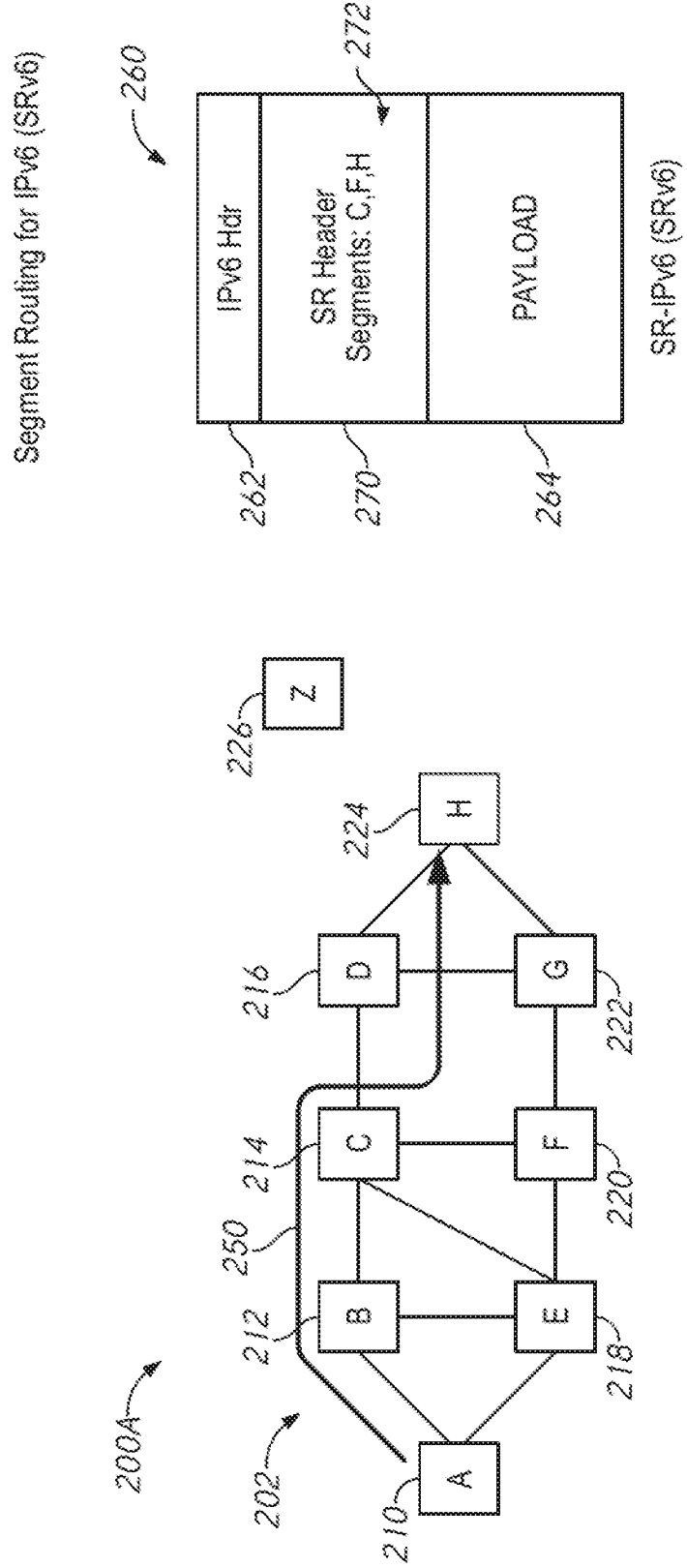
FIGS. 2A-2D are illustrative block diagrams of communication networks operative to route communications with use of segment routing (SR) and, in particular, with use of SR for IPv6 (SRv6)

With reference first to FIG. 2A, a network 200a which includes a plurality of nodes 202 (e.g. routers, servers, base stations, gateways, CP or UP entities, etc.) is shown. In this example, the plurality of nodes 202 includes nodes 210, 212, 214, 216, 218, 220, 222, 224, and 226 which are designated as nodes A, B, C, D, E, F, G, H, and Z, respectively. Here, node 210 (i.e. node A) is considered to be a source node and node 226 (i.e. node Z) is considered to be a destination node. Nodes 212, 214, 216, 218, 220, 222, and 226 which correspond to nodes B, C, D, E, F, and G are part of an SR domain (i.e. nodes that are SRv6-capable nodes/SRv6-configured nodes). The source node (node 210 or A) and the destination node (node 226 or Z) are not part of or outside of the SR domain (e.g. they may or may not be SRv6-configured nodes, such as "regular" IPv6 nodes).

A basic data format of an SR-IPv6 packet 260 for use in SRv6 routing is also shown in FIG. 2A. As illustrated, the data format of SR-IPv6 packet 260 includes an IPv6 header 262 and a payload 264. For SRv6 routing of IPv6 packet 260, the data format of IPv6 packet 260 further includes an SR header 270 or "SRH" (i.e. an extension header for SR as defined by RFC 2460). SR header 270 may include an ordered list of segments 272 which defines a network path 250 along which the SR-IPv6 packet 260 will be communicated in network 200a. In the example of FIG. 2A, the ordered list of segments 272 includes node 214 ("node C"), node 220 ("node F"), and node 224 ("node H") in network path 250. A segment is or includes an instruction (e.g. forwarding, servicing, application-specific, etc.) to be applied to the SR-IPv6 packet 260. Thus, an SR-IPv6 packet (e.g. SR-IPv6 packet 260) may be communicated in network 200a from a source node (e.g. node 210 or A) to a destination node (e.g. a node 226 or Z) along a desired or predetermined network path 250. The source node (e.g. node 210 or A) may operate to choose this network path 250 and encode it in the SR header 270 as the ordered list of segments 272. The rest of network 200a may operate to execute the encoded instructions without any further per-flow state.

Figure 2B:
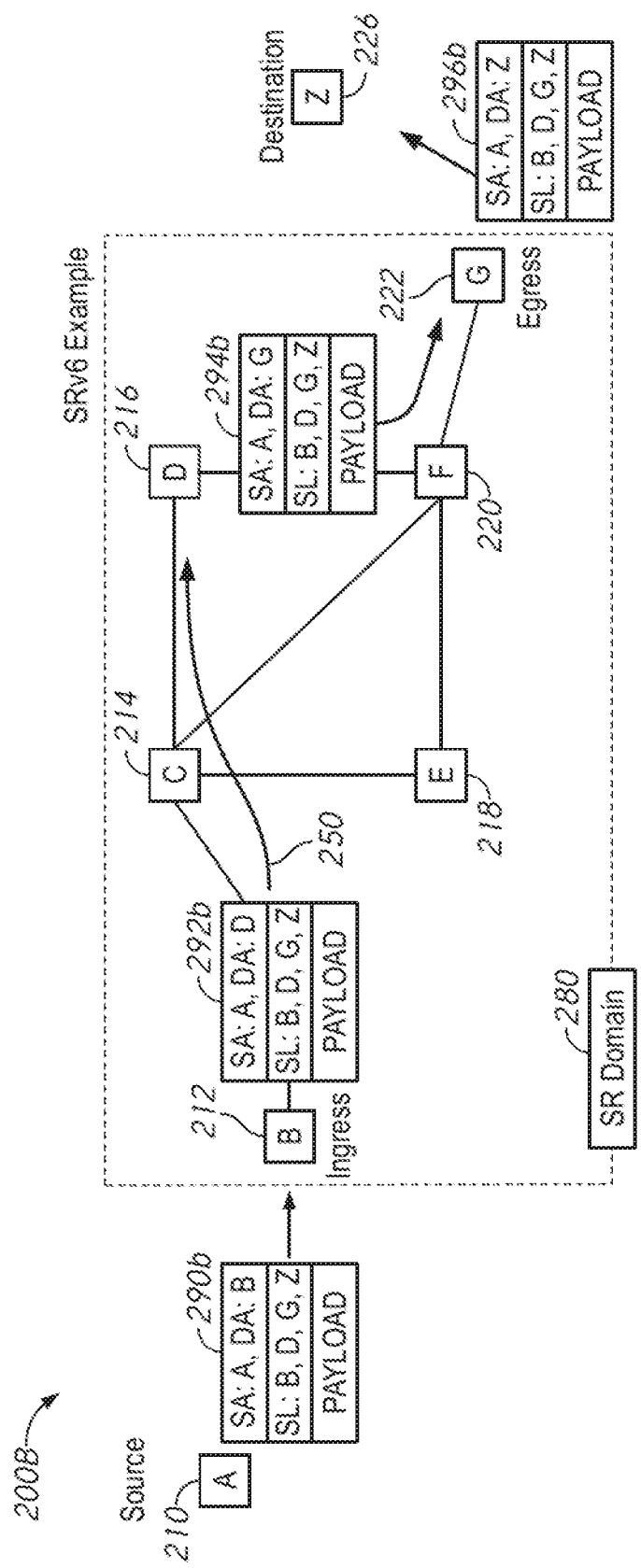

FIG. 2B is an illustrative representation of a network 200b which is similar to network 200a of FIG. 2A. Here, nodes 212, 214, 216, 218, 220, 222, and 226 which correspond to nodes B, C, D, E, F, and G are shown to be part of an SR domain 280. The source node (node 210 or A) and the destination node (node 226 or Z) are not part of or outside of the SR domain 280 (e.g. they may or may not be SRv6-configured nodes). In the example of FIG. 2B, node 212 or B may be considered as an ingress node of the SR domain 280 and node 222 or G may be considered as an egress node of the SR domain 280.

Note that an SR header may be inserted in an IPv6 packet at a source node or at an ingress node, or even encapsulated at the ingress node, as a few examples. In the example shown in FIG. 2B, an SR header of an IPv6 packet is inserted at the source node (node 210 or A) to produce an SR-IPv6 packet 290b. In this case, the source node (node 210 or A) which is SRv6-capable may originate the SR-IPv6 packet 290b. Here, the SR header of SR-IPv6 packet 290b includes an ordered list of segments (SL) designating nodes B, D, G, and Z to define network path 250. Initially, a source address (SA) of SR-IPv6 packet 290b is designated as node A and a destination address (DA) of SR-IPv6 packet 290b is designated as node B (i.e. the first node in the SL). When SR-IPv6 packet 290b is communicated to the ingress node (i.e. node 212 or B), the DA is modified by the ingress node to include the next or second node in the SL (i.e. node D), as indicated in SR-IPv6 packet 292b. When SR-IPv6 packet 292b is communicated to the node D (via node C), the DA is modified by node D to include the next or third node in the SL (i.e. node G), as indicated in SR-IPv6 packet 294b. When SR-IPv6 packet 294b is further communicated to the node G (via node F), the DA is modified by node G to include the next or fourth node in the SL (i.e. node Z which is the destination node), as indicated in SR-IPv6 packet 296b.

Figure 2C:
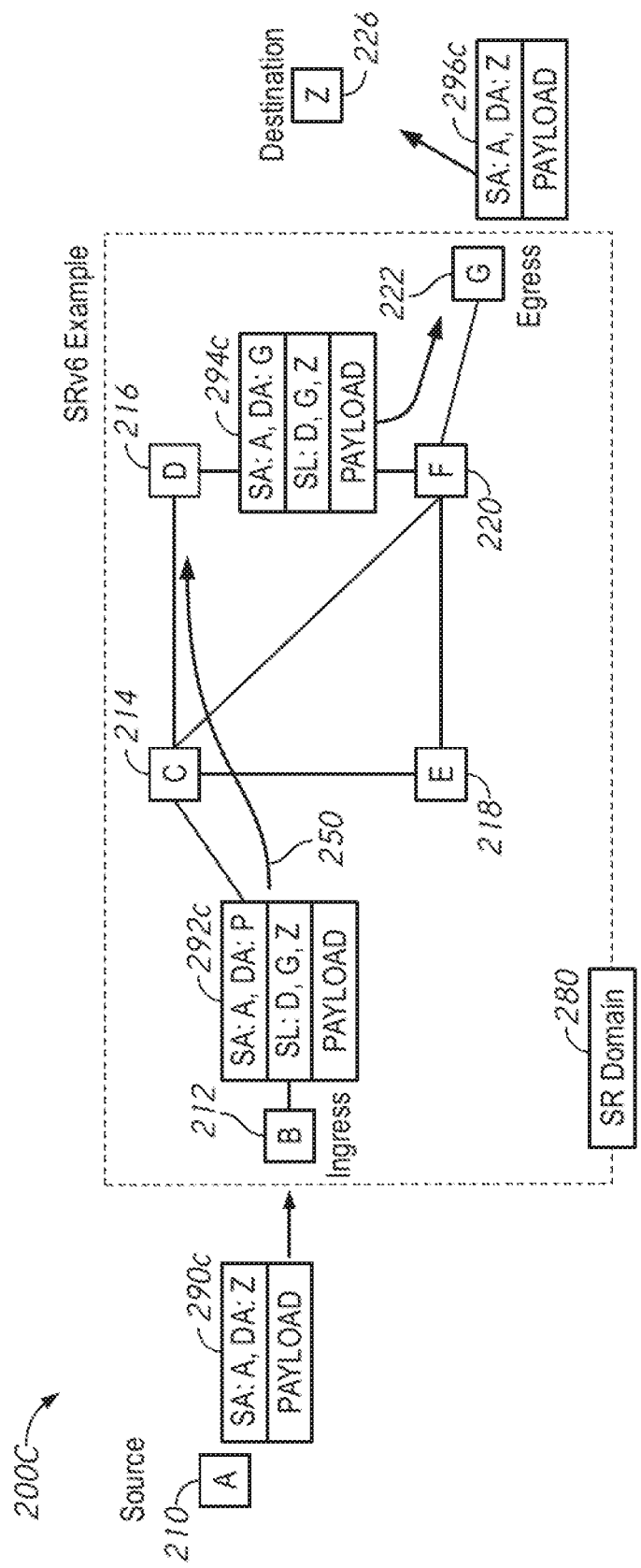

In the example of FIG. 2C, an SR header of an IPv6 packet 290c is inserted at the ingress node (node 212 or B) to produce an SR-IPv6 packet 292c. Here, the SR header of SR-IPv6 packet 292c includes an ordered list of segments (SL) designating nodes D, G, and Z to define network path 250. In this case, the source node, which may or may not be SRv6-configured, may originate the IPv6 packet 290c without any SR header. When SR-IPv6 packet 292c is communicated to node D (via node C), the DA is modified by node D to include the next or second node in the SL (i.e. node G), as indicated in SR-IPv6 packet 294c. When SR-IPv6 packet 294c is further communicated to the node G (via node F), the DA is modified by node G to include the next or third node in the SL (i.e. node Z, which is the destination node) and the SR header is removed, as indicated in IPv6 packet 296c. Here, similar to the source node, the destination node may or may not be SRv6-configured.

Figure 2D:
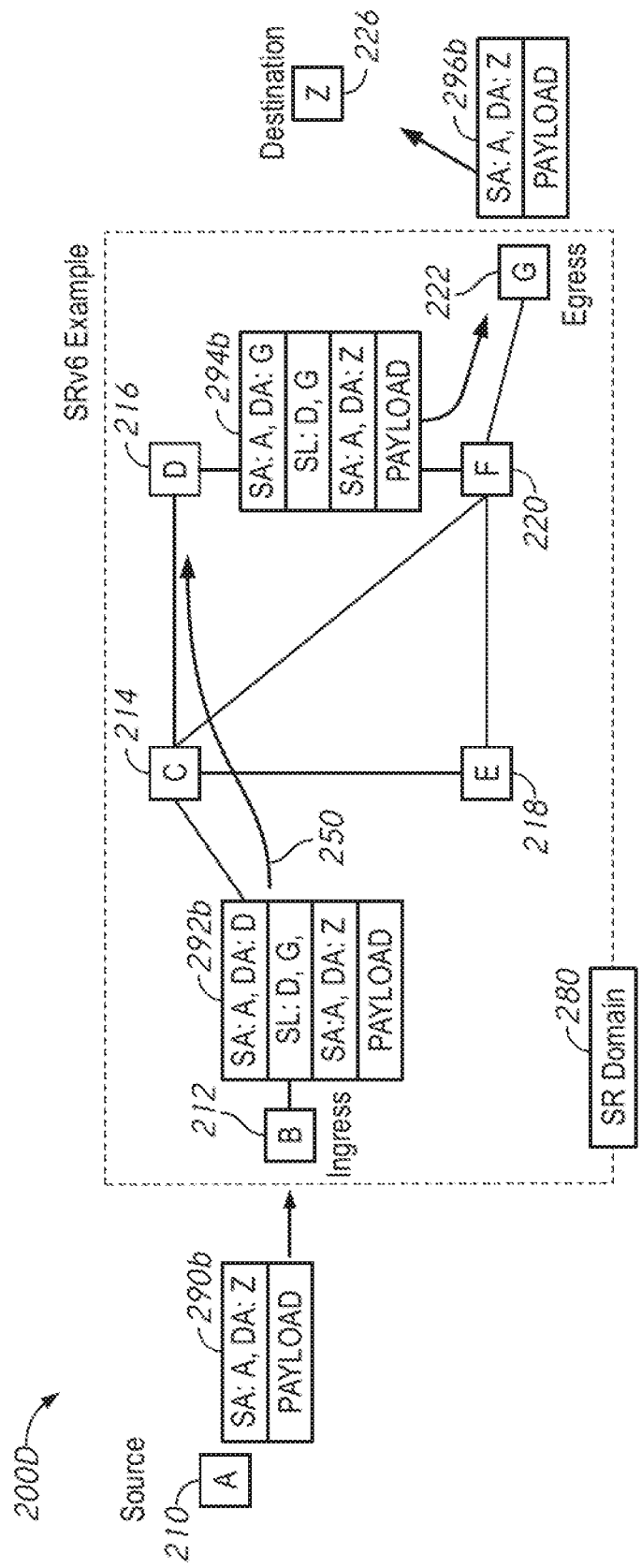

In the example of FIG. 2D, the source node, which may or may not be SRv6-configured, originates an IPv6 packet 290d without any SR header. The ingress node (node 212 or B) operates to encapsulate IPv6 packet 290d with a new, outer IPv6 header followed by an SR header, to produce an SR-IPv6 packet 292d. The SL of the SR header includes nodes D and G, but does not include the destination node (node 226 or Z). When SR-IPv6 packet 292d is communicated to node D (via node C), the DA is modified by node D to include the next or second node in the SL (i.e. node G), as indicated in SR-IPv6 packet 294d. When SR-IPv6 packet 294d is further communicated to the node G (via node F), the SR-IPv6 packet 294d is decapsulated by node G, which is represented by SR-IPv6 packet 296d. Here, similar to the source node, the destination node may or may not be SRv6-configured.

Note that the current state of the art for SRv6 is further described in various standards-related documents, including Internet Engineering Task Force (IETF) documents, such as "Segment Routing Architecture" identified by "draft-ietf-spring-segment-routing-14"; "IPv6 Segment Routing Header (SRH)" identified by "draft-ietf-6man-segment-routing-header-07"; and "SRv6 Network Programming" identified by "draft-filsfils-spring-srv6-network-programming-03".

In the context of the 5G mobile network of FIGS. 1A, 1B, and 1C above, there is a need to easily provide and facilitate the communication of SR path information of SR paths available in relation NF instances or nodes. It would be desirable for such available information to facilitate a more appropriate and efficient use of network resources in the mobile network. Such features may further be for use in providing a more improved discovery and selection of NF instances for use in session communications for UEs.

Figure 3A:
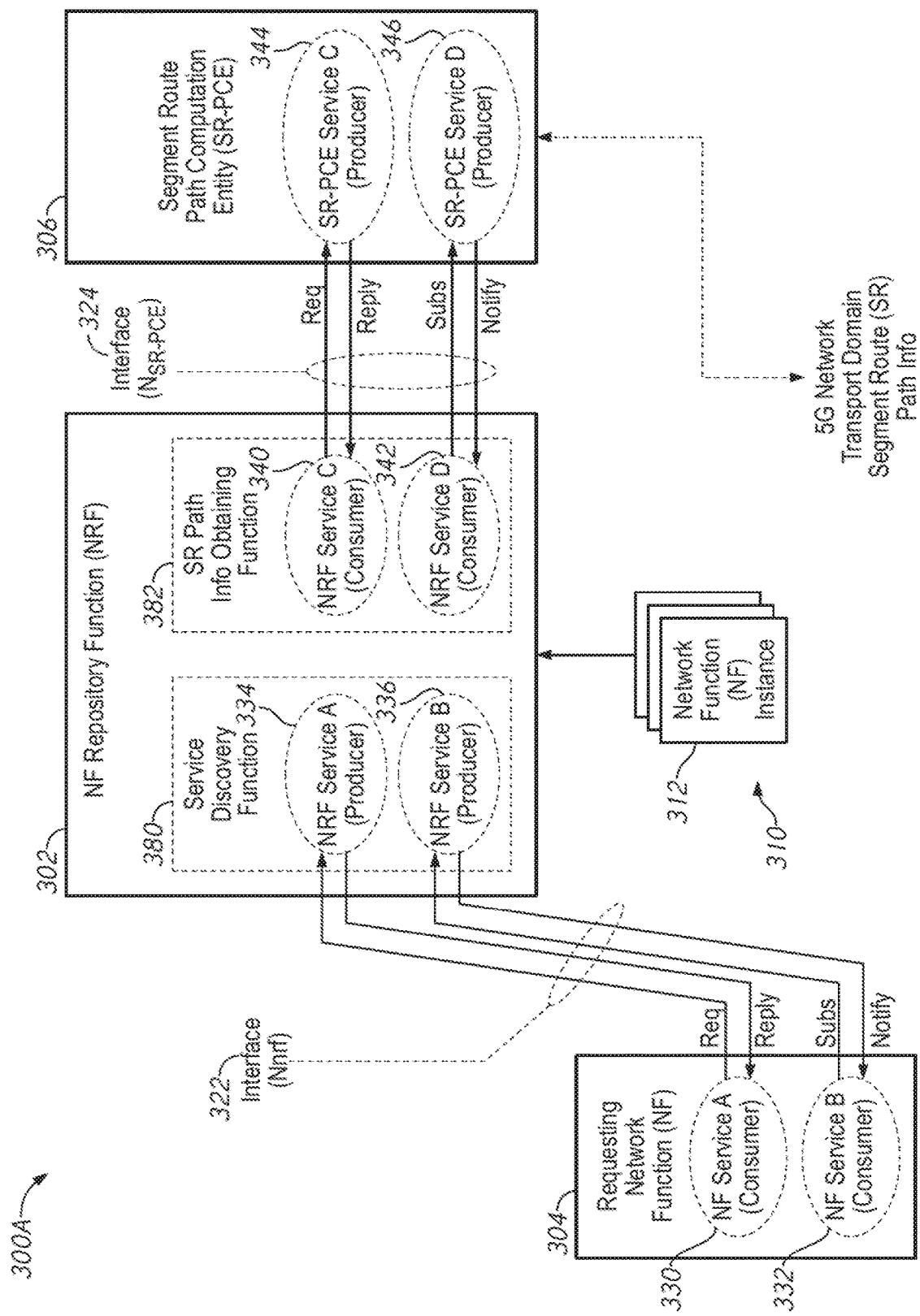
FIGS. 3A-3B are illustrative representations of a network function (NF) repository function (NRF) according to at least some implementations of the present disclosure, where the NRF has a first interface comprising an $N_{nrf}$ interface of a service discovery function and a second interface of a SR path information obtaining function for interfacing with a SR path computation entity (SR-PCE)

FIG. 3A is an illustrative representation of a Network Function (NF) Repository Function (NRF) 302 suitable for use in a 5G mobile network that utilizes segment routing (SR) according to at least some implementations of the present disclosure. NRF 302 may be configured in accordance with 3GPP specifications but modified according to the techniques of the present disclosure. In FIG. 3A, NRF 302 is shown to have an interface 322 (i.e. a first interface) and an interface 324 (i.e. a second interface).

Interface 322 may be an $N_{nrf}$ interface for use with a service discovery function 380 of the NRF. The $N_{nrf}$ interface with the service discovery function 380 may be configured to receive a discovery request from an NF (e.g. a requesting NF 304), discover one or more NF instances (e.g. NF instances 310, such as an NF instance 312) based on at least one service, application, or subscription requirement obtained according to the discovery request, and respond to the discovery request with the one or more discovered NF instances (e.g. information regarding the discovered NF instance). Here, service discovery function 380 may include an NRF service (producer) 334 for receiving and replying to discovery requests associated with an NF service (consumer) 330 of requesting NF instance 304. Additionally or alternatively, service discovery function 380 may include an NRF service (producer) 336 for receiving subscription requests and providing notifications/publications associated with an NF service (consumer) 332 of requesting NF instance 304.

Interface 324 may be for use with a SR path information obtaining function 382 for interfacing with a SR path computation entity (SR-PCE) 306. SR-PCE 306 may be configured to obtain SR path information associated with various SR paths between NF instances or nodes in the mobile network (e.g. SR path computation, analysis, etc.). These nodes may be part of a transport network that is used by the mobile network. SR-PCE 306 may be or include an SR-PCE server and/or one or more routers of the transport network used by the mobile network.

The SR path information may be or include information that identifies and/or defines the SR paths, and/or operating or policy parameters associated with the SR paths, in relation to NF instances or nodes which may be or include, for example, AMF instances, SMF instances, UPF instances, or other such as RAN nodes including gNB nodes or base stations. An SR path may be defined (at least in part) by one or more Segment IDs (SIDs) or a SID list. Parameters associated with the SR paths may be or include an operating status parameter, a latency parameter, a resiliency parameter, and a bandwidth parameters. Another parameter associated with an SR path may be a weight or preference parameter, for use in a weighted or preferential selection of an SR path (e.g. during NF selection). This weight or preference parameter may be set by NRF 302 or SR-PCE 306; the operating status parameter may also be set by NRF 302 or SR-PCE 306.

SR path information obtaining function 382 of NRF 302 may be configured to receive SR path information associated with an SR path of at least some of a plurality of SR paths between different pairs of NF instances (e.g. NF instances 310) or nodes which are candidate pairs for session communication. Again, the NF instances or nodes may be or include, for example, AMF instances, SMF instances, UPF instances, or other such as RAN nodes including gNB nodes or base stations. SR path information obtaining function 382 may be configured to store the SR path information for each SR path in association with the respective candidate pair or at least one of the NF instances of the pair. In some implementations, NRF 302 may be configured to maintain such SR path information in relation to NF profile information, such as that described in relation to 3GPP specifications, including section 6.2.6 of 3GPP TS 23.501.

In some implementations, SR path information obtaining function 382 may include an NRF service (consumer) 340 for requesting and receiving information from a SR-PCE service (producer) 344 of SR-PCE 306. Additionally or alternatively, SR path information obtaining function 342 may include an NRF service (consumer) 342 for subscribing to notifications/publications of a SR-PCE service (producer) 346 of SR-PCE 306.

Figure 3B:
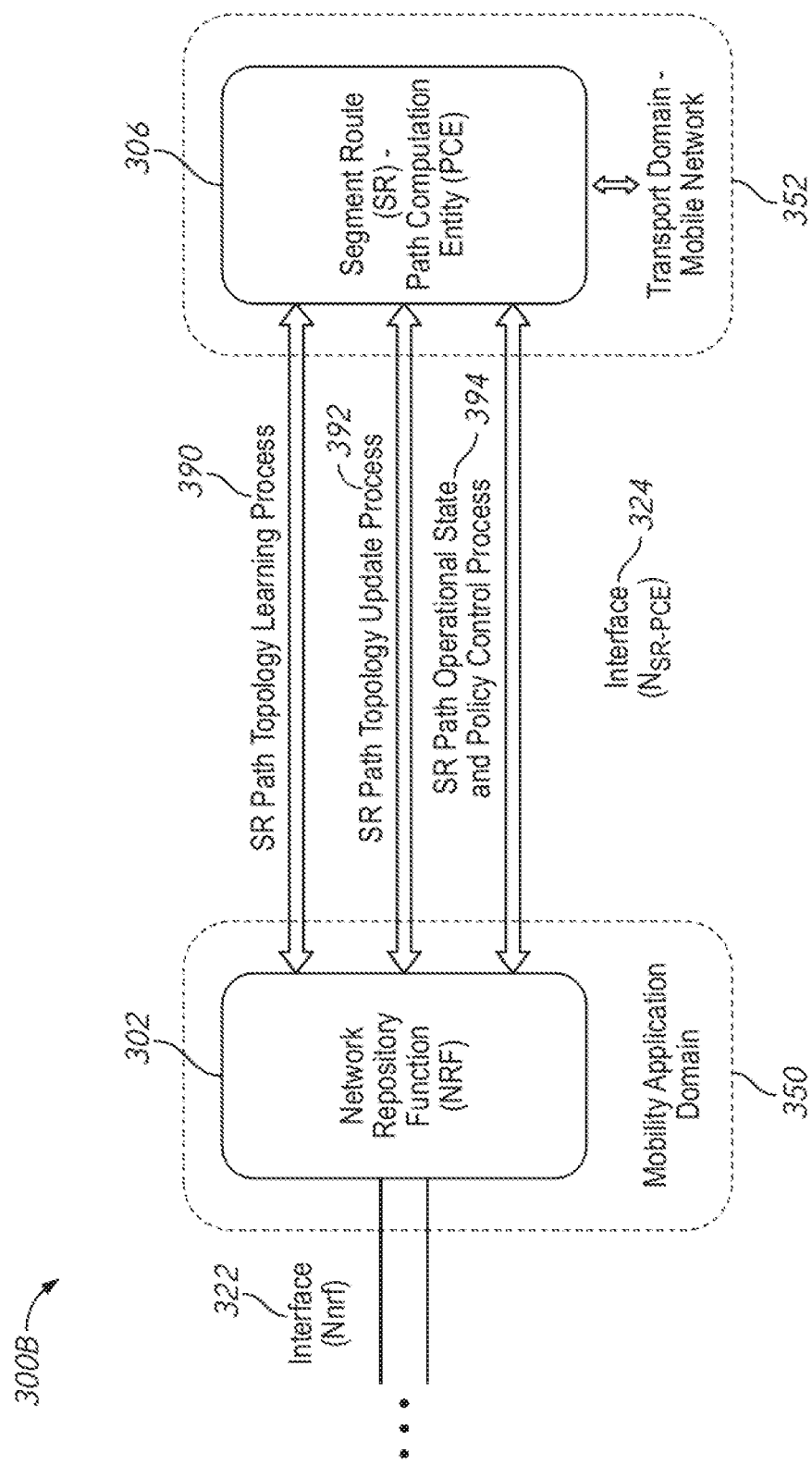

FIG. 3B is another illustrative representation of NRF 302 shown in a mobility application domain 350 and its interface 324 with SR-PCE 306 in a transport domain 352. The representation of FIG. 3B is similar to that shown in FIG. 3A, and indicating a plurality of processes 390 which may be carried out between NRF 302 and SR-PCE 306 via interface 324. Processes 390 may include an SR path topology learning process 380, an SR path topology update process 382, and an SR path operation state and policy control process 384.

SR path topology learning process 380 may be a process for NRF 302 to (e.g. initially) learn the SR path topology (e.g. including the SR path information) of the mobile network from SR-PCE 306, as SR-PCE 306 is configured to obtain such transport domain information (e.g. by path computation, etc.). The SR path information in SR-PCE 306 may therefore be pre-computed in some or many instances, or alternatively calculated on-the-fly in response to requests. In some implementations, NRF 302 may utilize one or both of the NRF services (consumer) 340 and 342 in SR path topology learning process 380.

SR path topology update process 382 may be a process for NRF 302 to (e.g. regularly or periodically, on an on-going basis) update the SR path topology from SR-PCE 306. As mobility nodes are added, removed, or provided with new services, NRF 302 may be notified. NRF 302 may also receive associated topology information, for example, as a result of analytics events from a Network Wide Data Analytics Function (NWDAF) or (dynamic) loading information from an SMF. These changes may invoke modifications to the SR paths such that SR-PCE 306 is notified and configured to report such changes to NRF 302. In some implementations, NRF 302 may utilize one or both of the NRF services (consumer) 340 and 342 in SR path topology update process 382 (e.g. updates may be provided with use of subscription notifications of NRF service (consumer) 342).

SR path operational state and policy control process 384 may be a process or set of processes for NRF 302 to control and maintain SR paths. For example, events such as routing failures, bandwidth availability changes, and latency increases occurring during operation of the network may result in path recomputation. Thus, operational state and policy control may be needed. This process 384 or set of processes may also relate to processing associated with a canary upgrade or phased rollout (an example of which is described later in relation to FIG. 5).

Figure 4A:
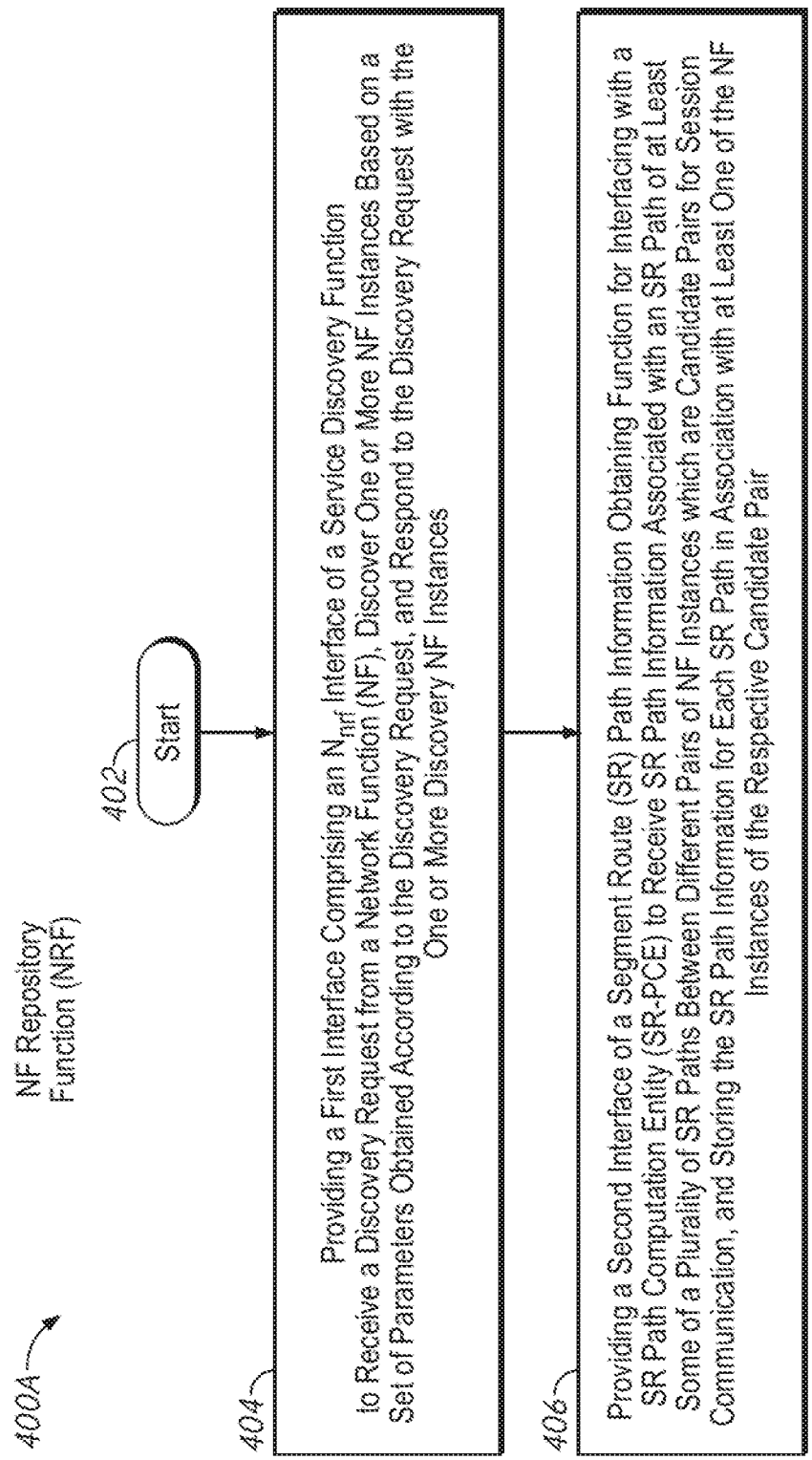
FIGS. 4A-4C are flowcharts for describing methods for use with an NRF of a mobile network according to some implementations of the present disclosure.

FIG. 4A is a flowchart 400A for describing a method for use with an NRF of a mobile network according to some implementations of the present disclosure. The method may be performed at a mobility node, such as one or more NRF nodes. The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

Figure 4B:
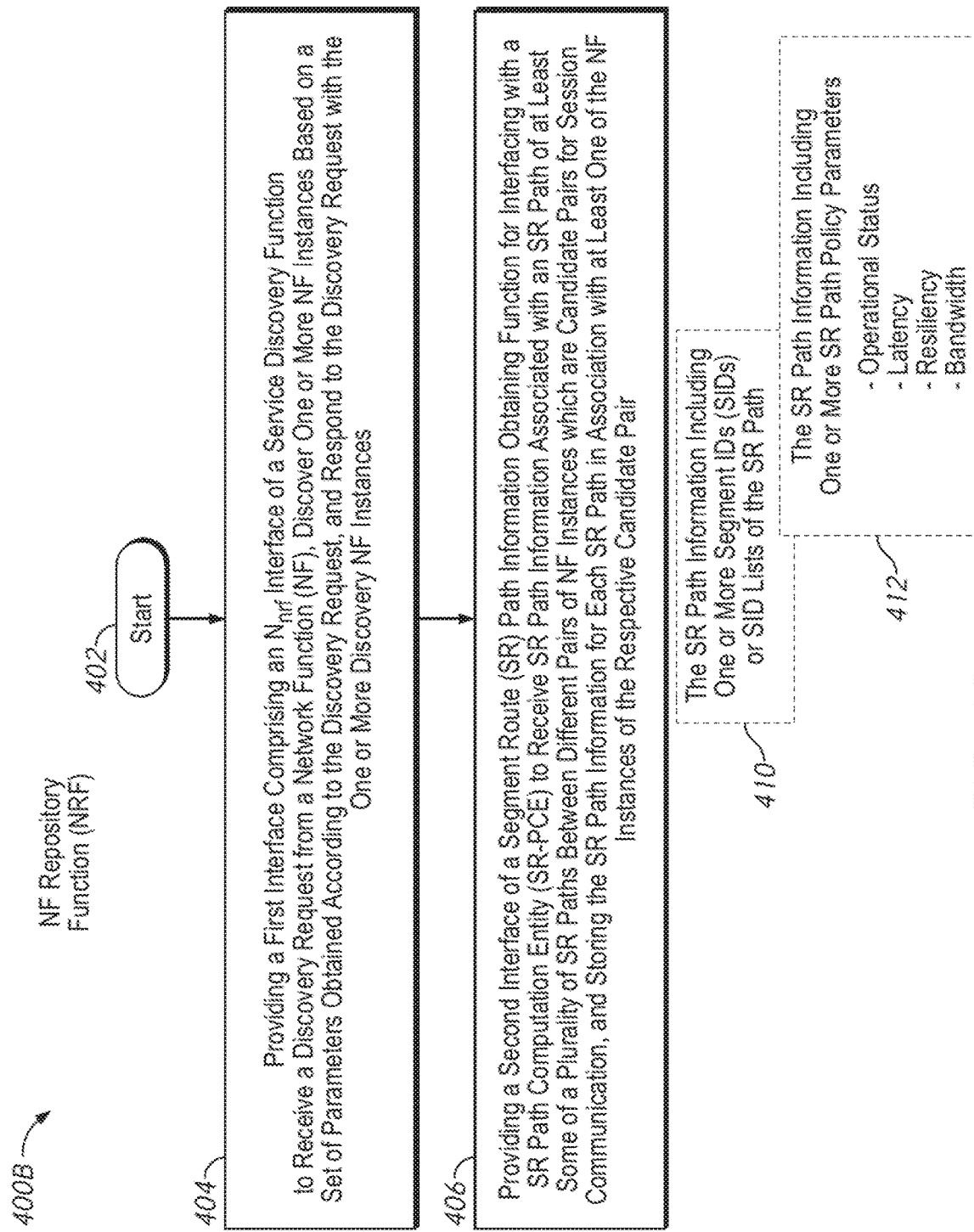

Beginning at a start block 402 of FIG. 4A, the method includes providing an NRF with a first interface comprising an $N_{nrf}$ interface of a service discovery function (step 404 of FIG. 4A). The service discovery function with the first interface may be configured to receive a discovery request from a network function (NF), discover one or more NF instances based on at least one of a service, application, or subscription requirement obtained according to the discovery request, and respond to the discovery request with the one or more discovered NF instances. The method further includes providing the NRF with a second interface of a segment route (SR) path information obtaining function for interfacing with a SR path computation entity (SR-PCE) (step 406 of FIG. 4A). The SR path information obtaining function may be configured to receive SR path information associated with an SR path of at least some of a plurality of SR paths between different pairs of NF instances or nodes which are candidate pairs for session communication, and store the SR path information for each SR path in association with at least one of the NF instances of the respective candidate pair, FIG. 4B is a flowchart 400B for describing a method for use with an NRF of a mobile network according to some implementations of the present disclosure. The method is the same as that of FIG. 4B, further including data blocks 410 and 412. The SR path information referred to in step 406 may be one or more SIDs or a SID list which defines the SR path (data block 410 of FIG. 4B). In addition or as an alternative to data block 410, the SR path information referred to in step 406 may be one or more SR path policy parameters (data block 412 of FIG. 4B). As indicated, the one or more SR path policy parameters may be a set of parameters which may be or include an operational status parameter, a latency parameter, a resiliency parameter, and a bandwidth parameter. Another parameter associated with an SR path may be a weight or preference parameter, for use in a weighted or preferential selection of an SR path (e.g. during NF selection). This weight or preference parameter may be set by the NRF and/or SR-PCE; the operating status parameter may also be set by the NRF and/or the SR-PCE.

Figure 4C:
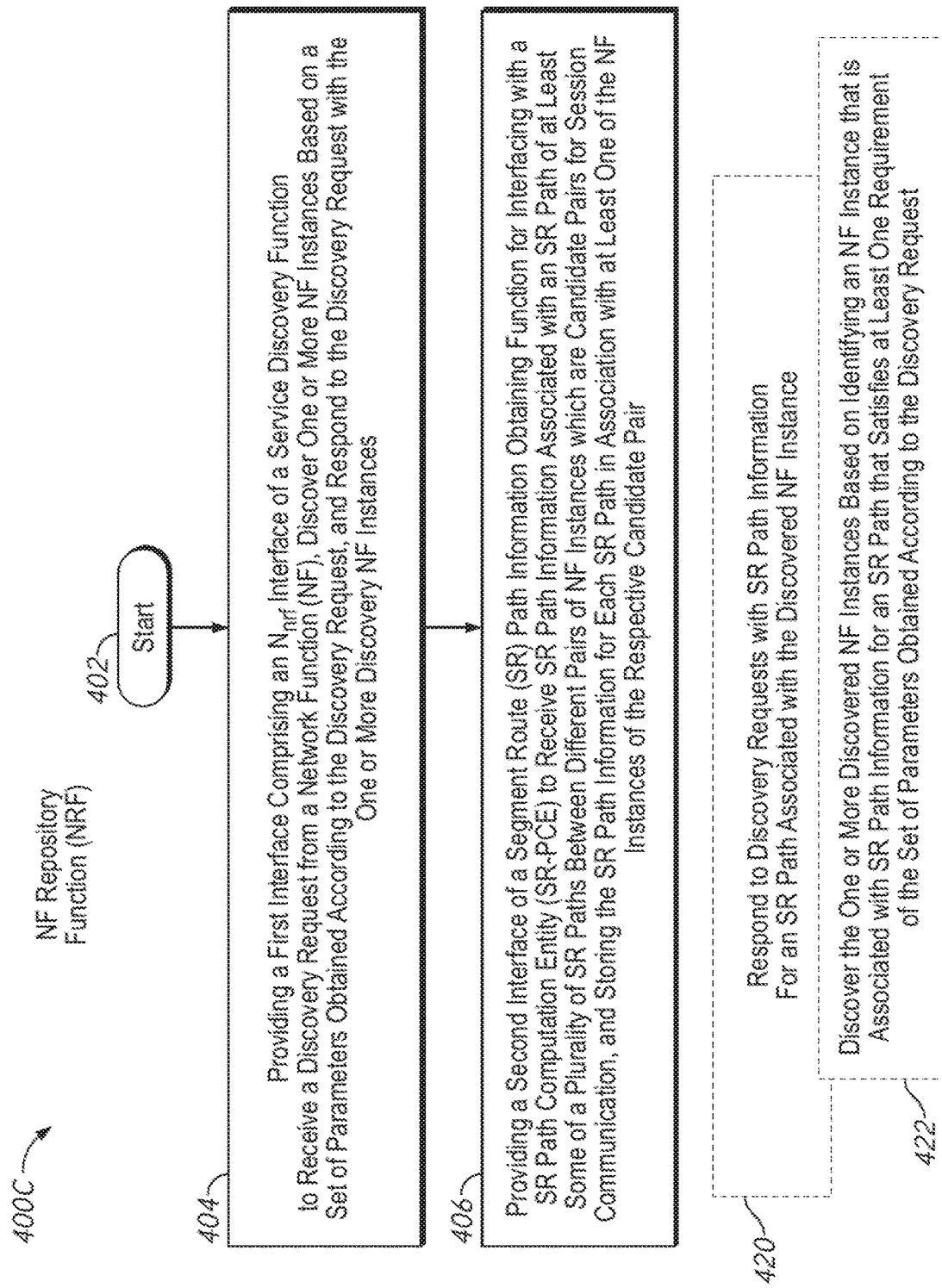

FIG. 4C is a flowchart 400C for describing a method for use with an NRF of a mobile network according to some implementations of the present disclosure. The method of FIG. 4C may be used together with any of the methods of FIG. 4B or separate therefrom. The method is the same as that of FIG. 4B, further including additional steps 420 and 422. The service discovery function with the $N_{nrf}$ interface may be further configured to respond to discovery requires with SR path information for an SR path associated with the discovered NF instance (step 420 of FIG. 4C). In addition or as an alternative to step 420, the service discovery function may be further configured to discover one or more NF instances based on identifying an NF instance being associated with SR path information that accords to least one service, application, or subscription requirement obtained according to the discovery request (step 422 of FIG. 4C). The discovery may take into consideration one or more requirements and stored policy parameters associated with the SR-path, e.g., including an operational status parameter, a latency parameter, a resiliency parameter, a bandwidth parameter, and/or a weight or preference parameter.

Figure 5:
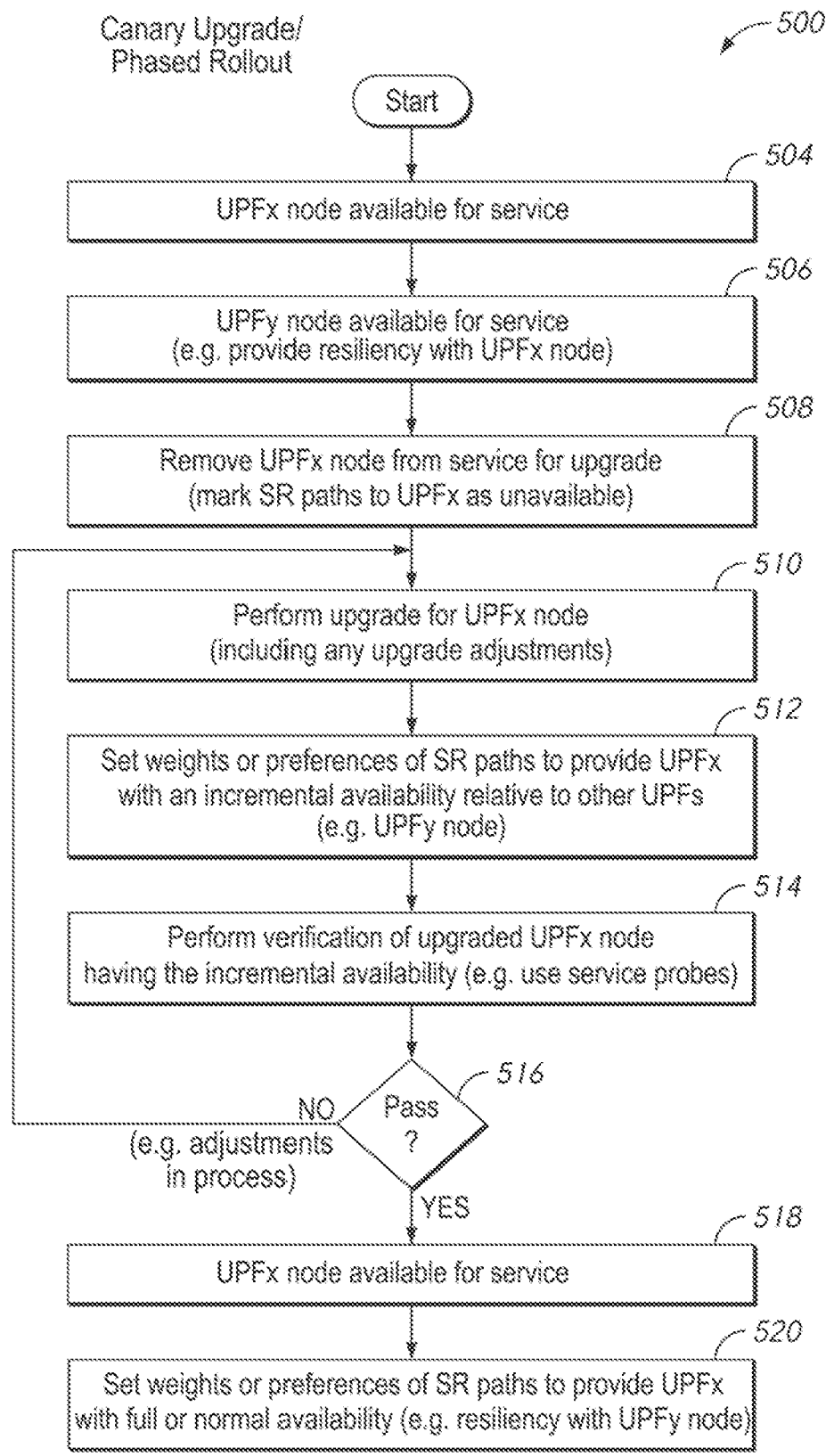
FIG. 5 is a flowchart for describing a method for use in a canary upgrade according to some implementations of the present disclosure.

FIG. 5 is a flowchart 500 for describing a method for use in operations and maintenance of a mobile network according to some implementations of the present disclosure. These implementations of the present disclosure may be specifically adapted for use with the method of FIG. 5, which may be more generally referred to as a canary upgrade or phased rollout. The method of FIG. 5 is a specific example directed to operations and maintenance of a UPF, but many other variations with UPFs and/or other NFs may be provided as one ordinarily skilled in the art would readily appreciate.

Beginning at a start block 502 of FIG. 5, a $UPF_x$ node is provided and made available for use in the mobile network (step 504 of FIG. 5). In addition, a $UPF_y$ node is provided and made available for use in the mobile network (step 506 of FIG. 5). The $UPF_y$ node may be made available in the mobile network for resiliency with the $UPF_x$ node (e.g. along with any other UPF nodes provided for resiliency). Sometime during operation, it is identified that one or more of the UPF nodes and/or associated paths need to be upgraded (e.g. a new version release). In response, the $UPF_x$ node may be removed from service for the upgrade (step 508 of FIG. 5). Here, weights or preferences of one or more SR paths to the $UPF_x$ node may be marked or set such that the $UPF_x$ node is made unavailable (e.g. the SR paths from a gNB to the $UPF_x$). The upgrade for the $UPF_x$ node may then be performed (step 510 of FIG. 5). The upgrade may be considered as completed but for service verification. For the verification, weights or preferences of the SR paths to the upgraded $UPF_x$ node may be set such that the $UPF_x$ node is provided with an (small) incremental availability for service relative to the other UPF nodes (e.g. $UPF_x$:$UPF_y$=5:95).

Continuing with FIG. 5, verification of the upgraded $UPF_x$ node having the incremental availability may then be performed (step 514 of FIG. 5). The verification process may include the use or service probes and/or a private set of devices. If the verification does not (yet) pass (e.g. one or more adjustments are in process) (step 516 of FIG. 5), then the process may repeat for the upgrade, where the upgrade is continued or upgrade adjustments are made at step 510. Here, the weights or preferences of the SR paths to the upgraded $UPF_x$ node may be adjusted such that the $UPF_x$ node is provided with another increased incremental availability for service relative to the other UPF nodes (e.g. $UPF_x$:$UPF_y$=10:90) (again step 512 of FIG. 5). One or more additional iterations may take place (e.g. 15:90; 20:80; 30:70; etc.). When the verification passes at step 516, then the $UPF_x$ node is again made available for service (step 518 of FIG. 5). Here, the weights or preferences of the SR paths to the upgraded $UPF_x$ node may be (re)set such that the $UPF_x$ node is provided with full or normal availability (e.g. for resiliency with the $UPF_y$ node; $UPF_x$:$UPF_y$=50:50) (step 520 of FIG. 5).

Figure 6:
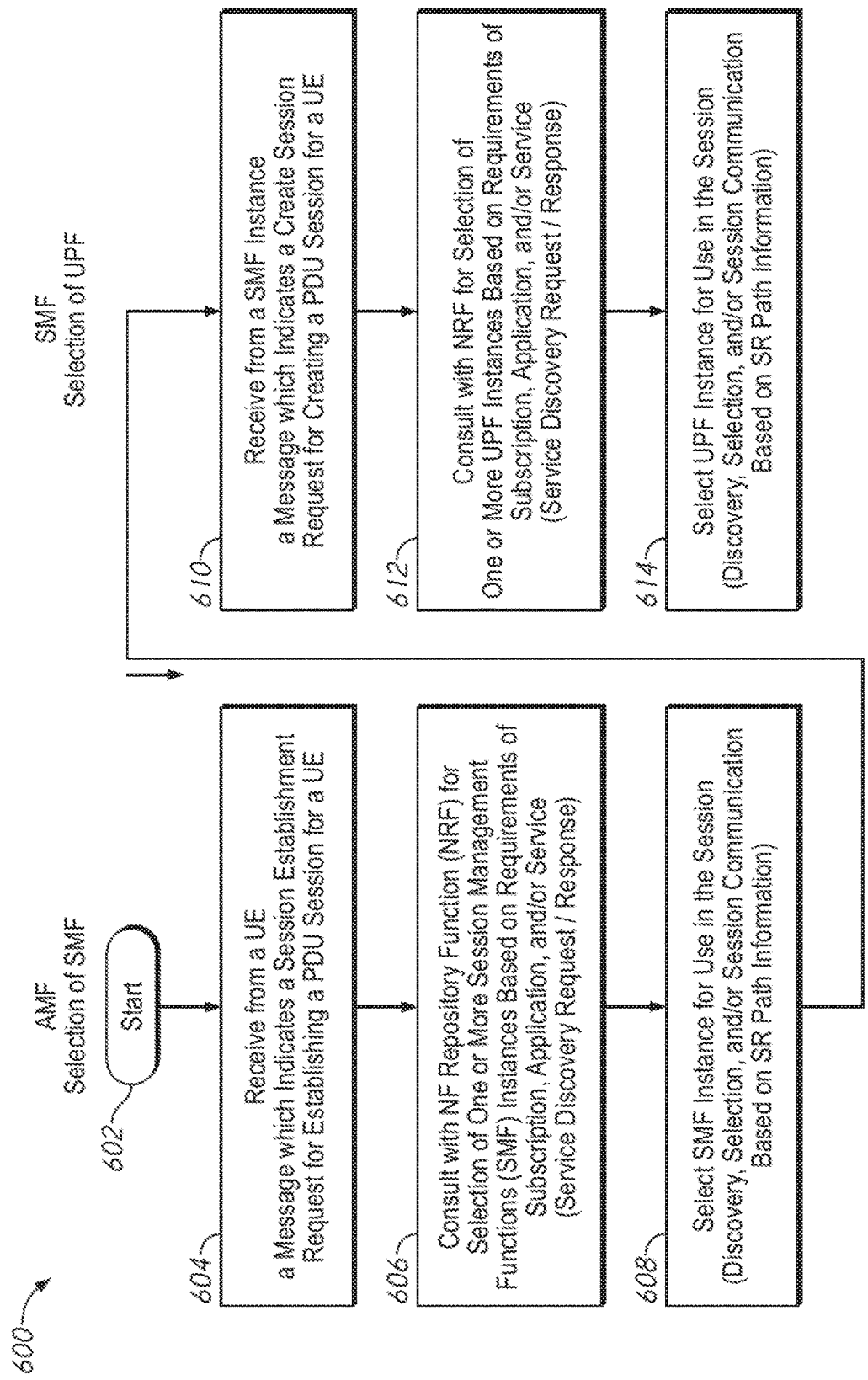
FIG. 6 is a flowchart for describing a method for use in discovering and/or selecting an NF instance for use in a session for a UE according to some implementations of the present disclosure.

FIG. 6 is a flowchart 600 for describing a method for use in discovering and/or selecting an NF instance for use in a session for a UE according to some implementations of the present disclosure. The method may be performed at a mobility node, such as one or more NF nodes or NRF nodes. The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

Beginning at a start block 600 of FIG. 6, an AMF may receive a message which indicates a session establishment request for establishing a PDU session for a UE (step 604 of FIG. 6). In response, the AMF may consult with an NRF (e.g. an NRF of the present disclosure) for discovery of one or more SMF instances that may be appropriate for use in the session (step 606 of FIG. 6). The one or more SMF instances may be discovered based on at least one service, application, or subscription requirement obtained according to the request. An SMF instance may be selected for use in the session for the UE (step 608 of FIG. 6). The discovery and/or selection of the SMF may be based on SR path information for an SR path associated with the SMF (e.g. a calculated parameter of the SR path, or alternatively an identifier, a SID, or a SID list of the SR path). Once the SMF is identified, the AMF may send a message to the SMF. Communication between the AMF and the selected SMF may be facilitated with use of SR path information (e.g. one or more SIDs or a SID list) for the SR path received in association with the discovered SMF instance in the discovery response.

The SMF may receive the message from the AMF (step 610 of FIG. 6). The message may indicate a create session request for establishing a PDU session for the UE. In response, the SMF may consult with the NRF for discovery of one or more UPF instances that may be appropriate for use in the session (step 612 of FIG. 6). The one or more UPF instances may be discovered based on at least one service, application, or subscription requirement obtained according to the request. A UPF instance may be selected for use in the session for the UE (step 614 of FIG. 6). The discovery and/or selection of the UPF may be based on SR path information for an SR path associated with the UPF (e.g. a calculated parameter of the SR path, or alternatively an identifier, a SID, or a SID list of the SR path). Communication between the SMF and the selected UPF may be facilitated with use of SR path information (e.g. one or more SIDs or a SID list) for the SR path received in association with the discovered UPF instance in the discovery response.

Figure 7:
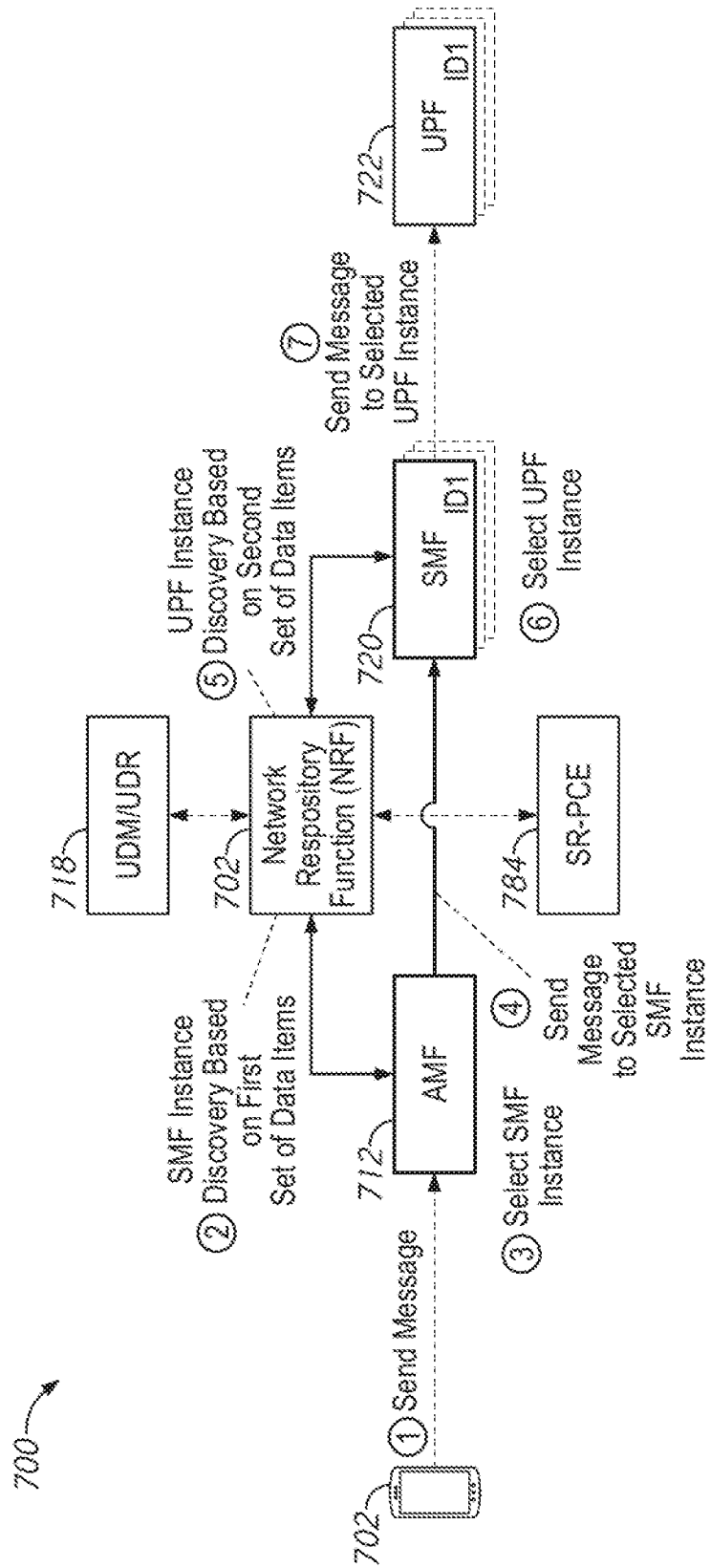
FIG. 7 is a flow diagram which may better illustrate the method described above in relation to FIG. 6.

FIG. 7 is a flow diagram 700 which may better illustrate the method described above in relation to FIG. 6. A UE 702 may send a message to the network for service. In turn, an AMF 712 may receive a message which indicates a session establishment request for establishing a PDU session for the UE (step 1 of FIG. 7). In response, the AMF 712 may consult with an NRF 782 for discovery of one or more SMF instances that may be appropriate for use in the session (step 2 of FIG. 7). The discovery may be performed based on at least one service, application, or subscription requirement obtained according to the request. At least some data items indicating such requirements may be obtained from a UDM/UDR 718. An SMF instance may be selected for use in the session for the UE (step 3 of FIG. 7). Here, the discovery and/or selection of the SMF may be further based on SR path information for an SR path associated with the SMF (e.g. where the information is previously obtained by the NRF 782 from an SR-PCE 784). In some implementations, the discovery and/or selection may be performed based on identifying the SMF instance being associated with SR path information (e.g. a calculated parameter of the SR path, or alternatively an identifier, a SID, or a SID list of the SR path) that accords to least one service, application, or subscription requirement obtained according to the discovery request.

The AMF 712 may send a message to the selected SMF (step 4 of FIG. 7). The selected SMF may receive the message from the AMF. The message may indicate a create session request for establishing a PDU session for the UE. In response, the SMF may consult with the NRF for discovery of one or more UPF instances that may be appropriate for use in the session (step 5 of FIG. 7). At least some data items indicating a requirement may be obtained from UDM/UDR 718. A UPF instance may be selected for use in the session for the UE (step 6 of FIG. 7). Here, the discovery and/or selection of the UPF may be further based on SR path information for an SR path associated with the UPF (e.g. where the information is previously obtained by the NRF 782 from SR-PCE 784). In some implementations, the discovery and/or selection may be performed based on identifying the UPF instance being associated with SR path information (e.g. a calculated parameter of the SR path, or alternatively an identifier, a SID, or a SID list of the SR path) that accords to least one service, application, or subscription requirement obtained according to the discovery request.

Figure 8A:
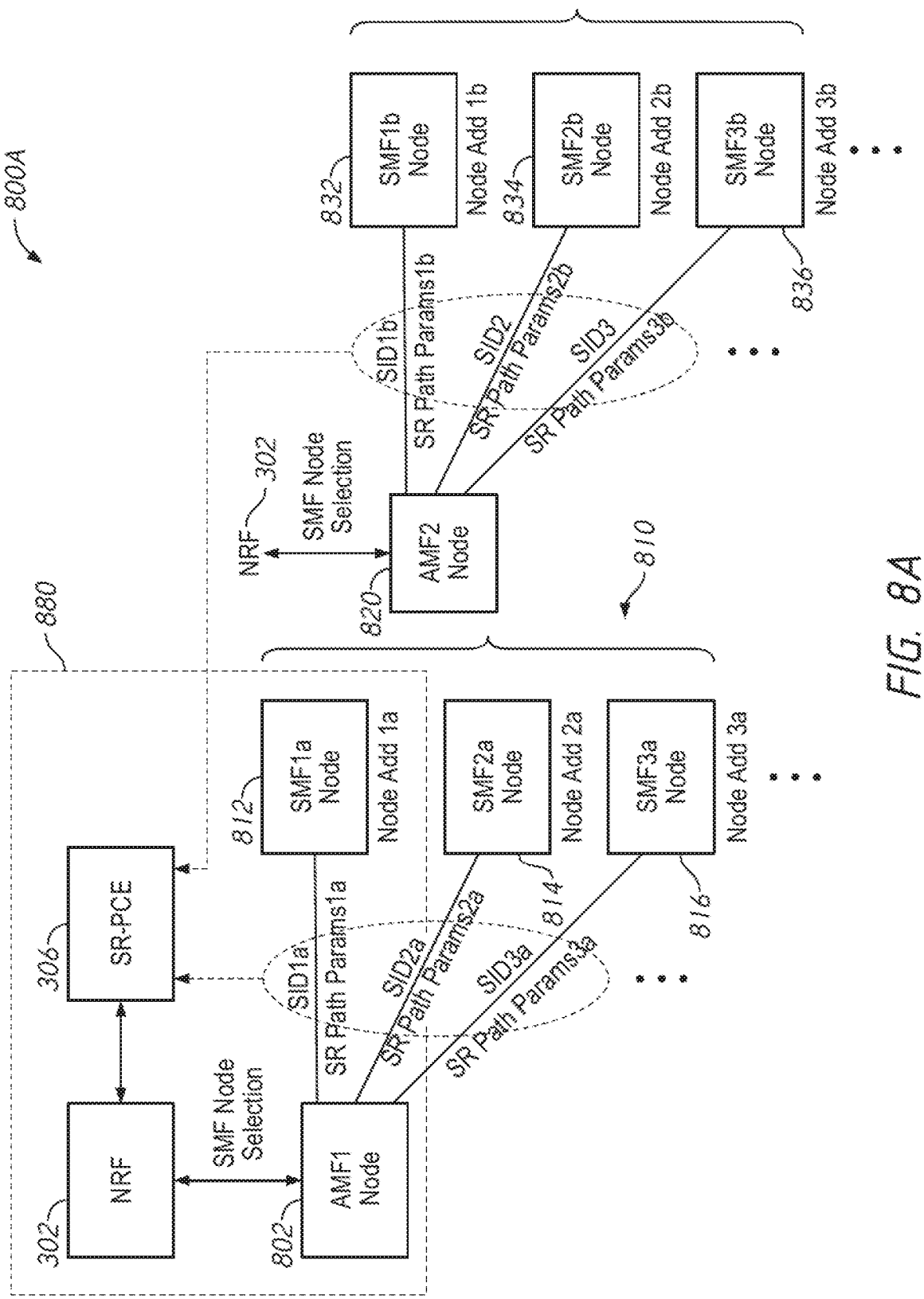
FIGS. 8A-8B are arrangements of network nodes and NF instances of the mobile network, including AMFs for selection of SMF instances for use in sessions for UEs.

FIG. 8A is an illustrative arrangement 800A of network nodes and NF instances of a mobile network, including AMFs for selection of SMF instances for use in sessions for UEs. In particular, an AMF node 802 may be configured to establish a session with any one of SMF nodes 810. SMF nodes 810 include an SMF node 812, an SMF node 814, and an SMF node 816. AMF node 802 may consult with NRF 302 in performing an SMF selection process. Further, an AMF node 820 may be configured to establish a session with any one of SMF nodes 830. SMF nodes 830 include an SMF node 832, an SMF node 834, and an SMF node 836. AMF node 820 may consult with NRF 302 in performing an SMF selection process.

Further shown in FIG. 8A is SR path information associated with an SR path of at least some of a plurality of SR paths between different pairs of NF instances or nodes which are candidate pairs for session communication. For example, an SR path between AMF node 802 and SMF node 812 may have an SR path defined by one or more SIDs 1a and characterized by a set of SR path policy parameters 1a; an SR path between AMF node 802 and SMF node 814 may have an SR path defined by one or more SIDs 2a and characterized by a set of SR path policy parameters 2a; and an SR path between AMF node 802 and SMF node 816 may have an SR path defined by one or more SIDs 3a and characterized by a set of SR path policy parameters 3a.

Further, for example in FIG. 8A, an SR path between AMF node 820 and SMF node 832 may have an SR path defined by one or more SIDs 1b and characterized by a set of SR path policy parameters 1b; an SR path between AMF node 820 and SMF node 834 may have an SR path defined by one or more SIDs 2b and characterized by a set of SR path policy parameters 2b; and an SR path between AMF node 820 and SMF node 835 may have an SR path defined by one or more SIDs 3b and characterized by a set of SR path policy parameters 3b.

Figure 8B:
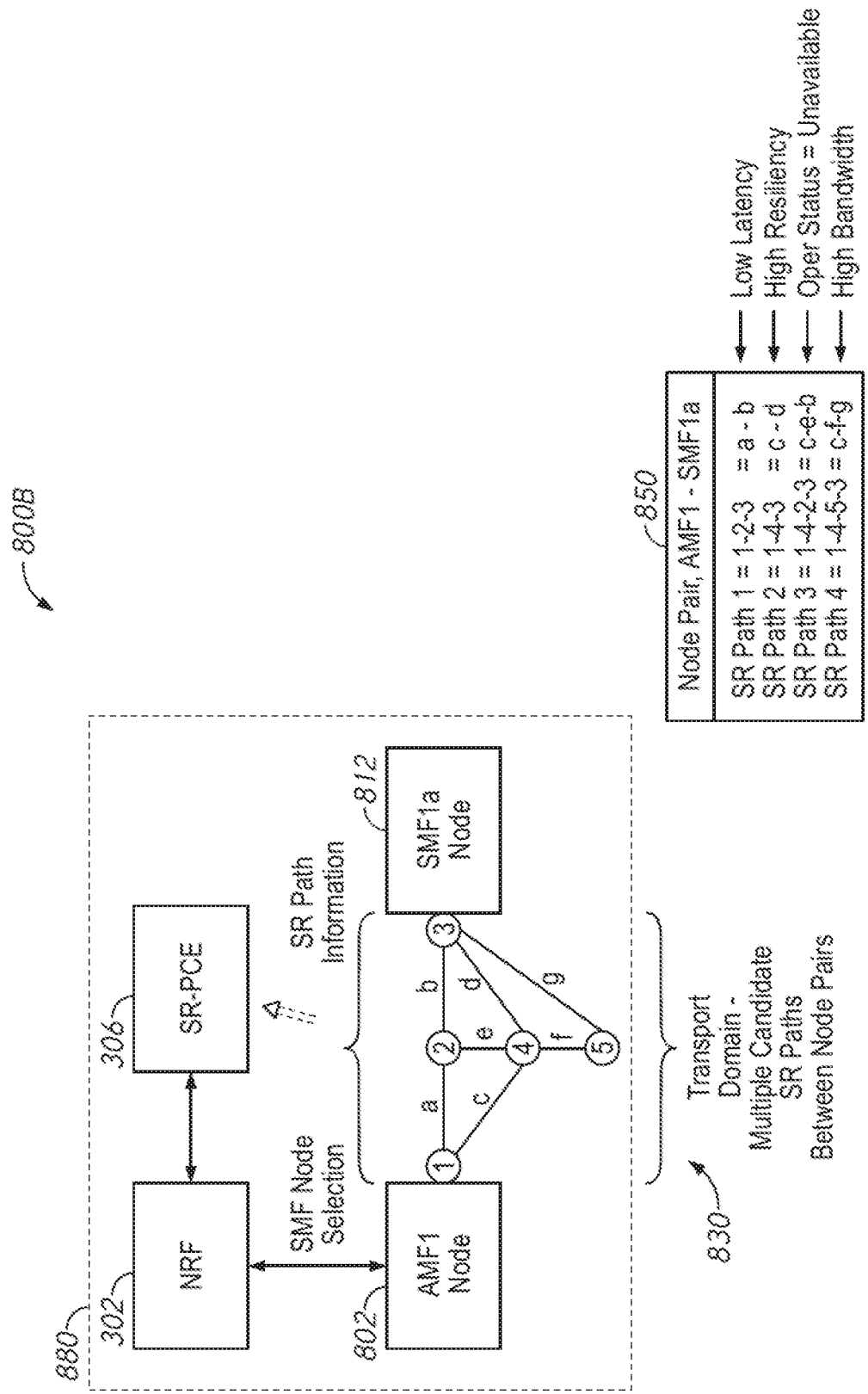

Each node pairing in the mobile network may be associated with a plurality of different SR paths. This is further illustrated in an arrangement 800B of FIG. 8B. The arrangement 800B of FIG. 8B includes a section 880 of FIG. 8A, which shows a plurality of SR paths 830 between AMF node 802 and SMF node 812. In the example of FIG. 8B as indicated in a table 850, an SR path 1 between AMF node 802 and SMF node 812 may be defined by routing points 1-2-3 (e.g. an SR path of low latency); an SR path 2 between AMF node 802 and SMF node 812 may be defined by routing points 1-4-3 (e.g. an SR path of high resiliency); an SR path 3 between AMF node 802 and SMF node 812 may be defined by routing points 1-4-2-3 (e.g. an SR path having an operational status of "unavailable"); and an SR path 4 between AMF node 802 and SMF node 812 may be defined by routing points 1-4-5-3 (e.g. an SR path of high bandwidth).

Figure 9A:
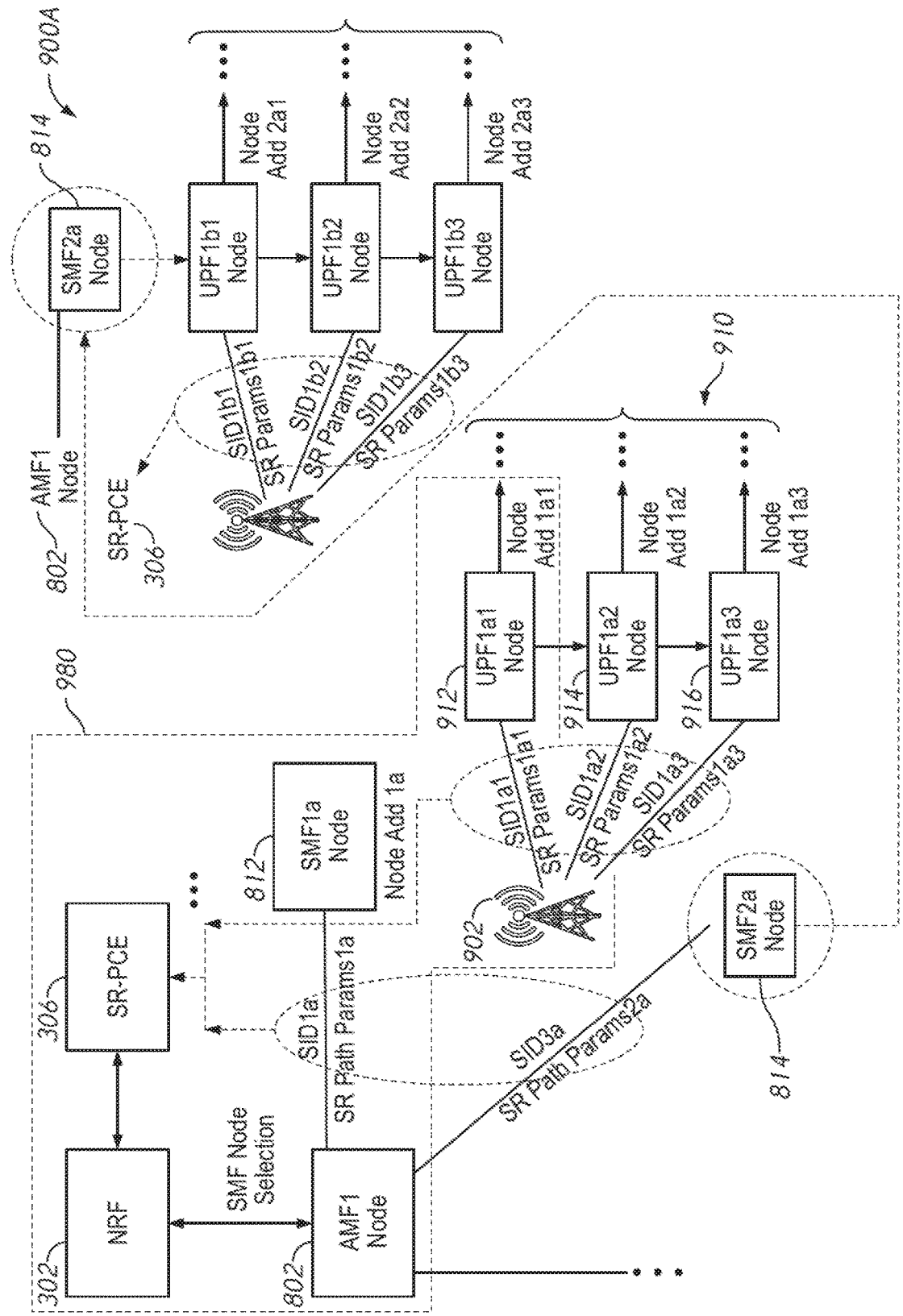
FIGS. 9A-9B are arrangements of network nodes and NF instances of the mobile network, and including AMFs for selection of SMF instances (as well as SMFs for selection of UPF instances) for use in sessions for UEs.

FIG. 9A is an illustrative arrangement 900A of network nodes and NF instances of the mobile network, and including AMFs for selection of SMF instances (as well as SMFs for selection of UPF instances) for use in sessions for UEs. In particular, an AMF node 802 may be configured to establish a session with either one of SMF nodes 812 and 814. AMF node 802 may select either one of SMF nodes 812 and 814 for the session based on SR path information for an SR path defined between those nodes. Additionally or alternatively, however, AMF node 802 may select either one of SMF nodes 812 and 814 based on SR path information associated with the SR paths between gNB nodes (e.g. gNB 902) and UPF nodes 910 that are associated with SMF node 812. In FIG. 9A, UPF nodes 910 include a UPF node 912, a UPF node 914, and a UPF node 916.

Figure 9B:
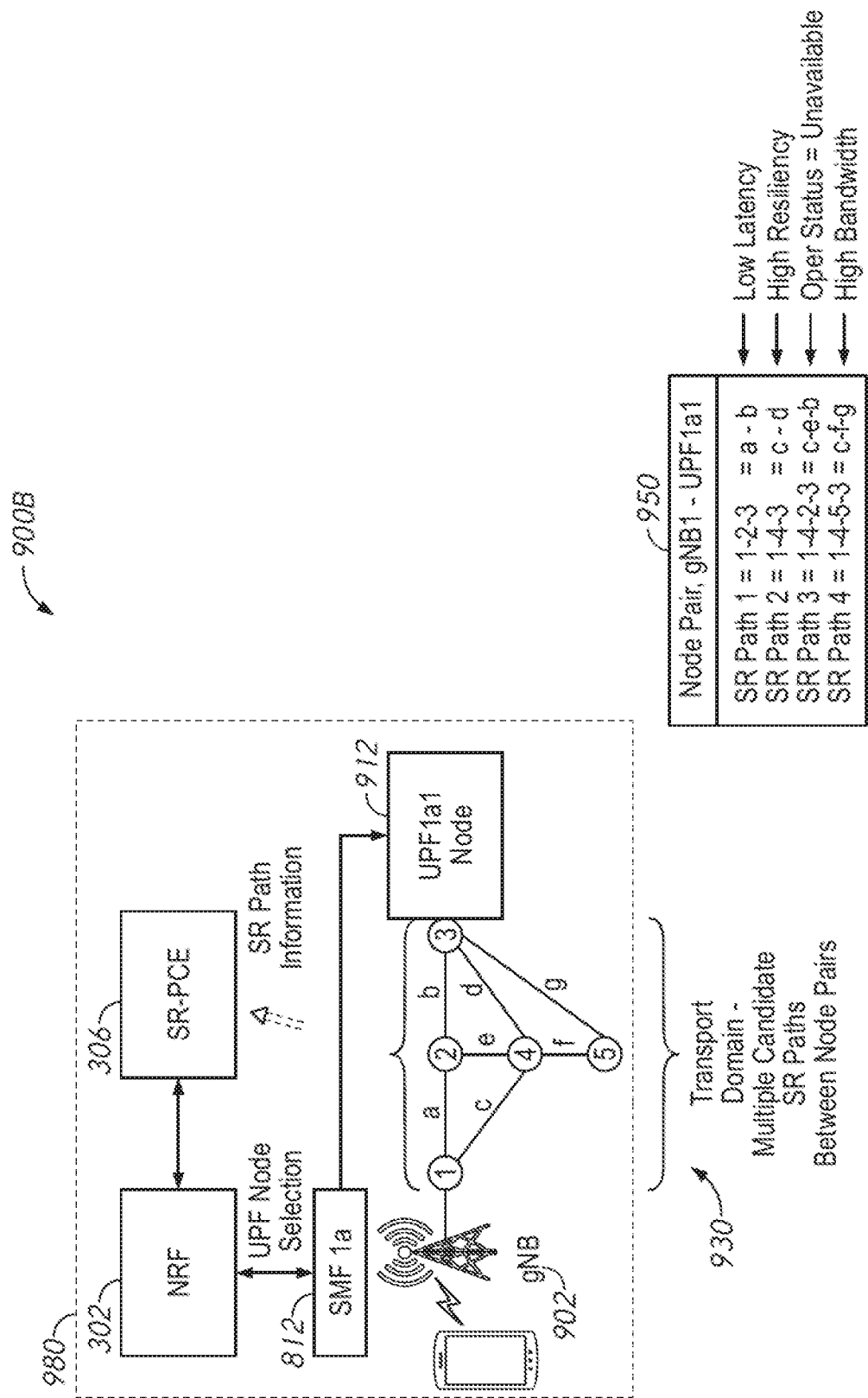

Each node pairing in the mobile network may be associated with a plurality of different SR paths. This is further illustrated in an arrangement 900B of FIG. 9B. The arrangement 900B of FIG. 9B includes a section 980 of FIG. 9A, which shows a plurality of SR paths 930 between gNB 902 and UPF node 912. In the example of FIG. 9B as indicated in a table 950, an SR path 1 between gNB 902 and UPF node 912 may be defined by routing points 1-2-3 (e.g. an SR path of low latency); an SR path 2 between gNB 902 and UPF node 912 may be defined by routing points 1-4-3 (e.g. an SR path of high resiliency); an SR path 3 between gNB 902 and UPF node 912 may be defined by routing points 1-4-2-3 (e.g. an SR path having an operational status of "unavailable"); and an SR path 4 between gNB 902 and UPF node 912 may be defined by routing points 1-4-5-3 (e.g. an SR path of high bandwidth).

FIG. 10 is a table 1000 which provides SR path information (e.g. see columns 1008, 1010, and 1012) associated with each SR path (e.g. see rows 1022, 1024, and 1026 as selected example SR paths) of a plurality of SR paths between different pairs 1002 of NF instances/nodes 1004 and 1006. The table 1000 illustrates one way in which such SR path information may be stored at or by an NRF of the present disclosure, but many variations are realizable as one ordinarily skilled in the art would readily appreciate. The NF instances/nodes 1004 and 1006 are candidate pairs 1002 for session communications. As indicated, the SR path information is stored in association with at least one of the NF instances 1004 or 1006 of the respective candidate pair 1002. The SR path information of FIG. 10 is shown to include an SR path identifier which may identify the SR path (see e.g. column 1008), a SID or a SID list which may define the SR path (see e.g. column 1010), and a set of SR path policy (e.g. calculated) parameters of the SR path.

FIG. 11 is a table 1100 which also provides the SR path information (e.g. see columns 1102, 1104, and 1106) associated with each SR path of the plurality of SR paths indicated in FIG. 10. Each SR path in rows 1122, 1124, and 1126 are the same example SR paths which correspond to rows 1022, 1024, and 1026 of FIG. 10. As indicated in FIG. 11, the one or more SR path policy parameters 1106 may be a set of parameters which may include an operational status parameter (see e.g. column 1112), a latency parameter (see e.g. column 1114), a resiliency parameter (see e.g. column 1114), and a bandwidth parameter (see e.g. column 1116). Again, the table 1110 illustrates one way in which such SR path information may be stored at or by an NRF of the present disclosure, but many variations are realizable as one ordinarily skilled in the art would readily appreciate.

As described earlier, the NRF having the interface with an SR-PCE may be suitable for improved discovery and/or selection of NF instances in a mobile network. For example, when an SR-PCE or NRF determines that an SR path is unavailable, then discovery and/or selection of NFs may exclude or omit NFs associated with (e.g. or having a high reliance on) the unavailable SR path. As another example, an AMF may discover/select an SMF instance that is associated with UPF instances having one or more gNB-UPF paths associated with SR policy parameters (e.g. low latency) that meet the requirements for the application or service (or conversely exclude those UPF instances that do not). As yet another example, an SMF may discover/select a UPF instance having one or more gNB-UPF paths associated with SR policy parameters (e.g. high bandwidth) that meet the requirements for the application or service (or conversely exclude those UPF instances that do not). As yet even another example, an AMF may discover/select an SMF instance that is associated with one or more AMF-SMF paths associated with SR policy parameters that do not have a special requirement (e.g. no need for low latency, high bandwidth, and/or high resiliency, therefore excluding discovery/selection of the associated NFs to therefore conserve precious or limited network resources for use in other needs).

Figure 12:
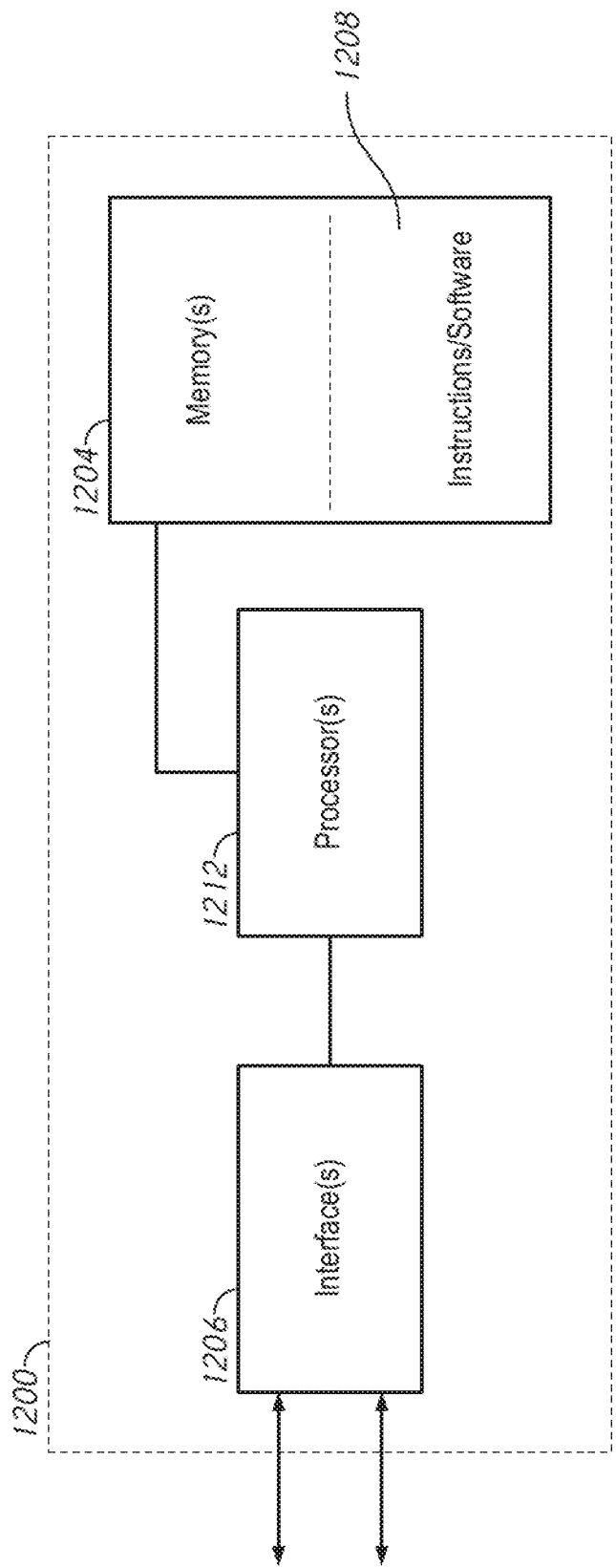
FIG. 12 is an illustrative representation of basic relevant components of a network element, network device, server, or network equipment for use in a mobile network according to some implementations of the present disclosure.

FIG. 12 is an illustrative representation of basic relevant components of a network element, network device, server, or network equipment 1200 for use in a mobile network according to some implementations of the present disclosure. The components may include one or more processors 1212 coupled to one or more memories 1204 and to one or more network interfaces 1206. Interface 1206 may be configured to connect to a network for communications. The one or more processors 1212 are configured to operate in accordance with program instructions/software 1208 stored in the one or more memories 1204, in order to perform basic operations as well as to perform techniques of the present disclosure. Relatedly, a computer program product may include a non-transitory computer-readable medium (e.g. memory, a computer disk, etc.) and program instructions stored in the non-transitory computer-readable medium such that, when executed by one or more processors 1212, may perform the techniques of the present disclosure.

Thus, an NRF having an interface with an SR-PCE suitable for improved discovery and selection of NF instances in a mobile network has been described. In one illustrative example, the NRF may have a first interface and a second interface. The first interface may be an $N_{nrf}$ interface of a service discovery function configured to receive a discovery request from an NF, discover one or more NF instances based on at least one of a service, application, or subscription requirement obtained according to the discovery request, and respond to the discovery request with the one or more discovered NF instances. The second interface may be of a SR path information obtaining function for interfacing with a SR path computation entity (SR-PCE). The SR path information obtaining function may be configured to receive SR path information associated with an SR path of at least some of a plurality of SR paths between different pairs of NF instances or nodes which are candidate pairs for session communication, and store the SR path information of each SR path in association with at least one of the NF instances of the respective candidate pair. The service discovery function may be configured to respond to the discovery request with SR path information (e.g. a SID or SID list) associated with a discovered NF instance. In addition, or as an alternative, the service discovery function may be configured to discover one or more NF instances based on identifying an NF instance associated with SR path information (e.g. a calculated parameter of the SR path) that accords to least one of a service, application, or subscription requirement obtained according to the discovery request.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first NF instance could be termed a second NF instance, and similarly, a second NF instance could be termed a first NF instance, without changing the meaning of the description, so long as all occurrences of the "first NF instance" are renamed consistently and all occurrences of the "second NF instance" are renamed consistently. The first NF instance and the second NF instance are both NF instances, but they are not the same NF instance.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A network function (NF) repository function (NRF) for a repository of information associated with a plurality of NF instances for a mobile network, the NRF being for use at a network node comprising one or more processors and memory for storing instructions that are executable by the one or more processors, the NRF comprising:
a first interface comprising an $N_{nrf}$ interface for a service discovery function;
instructions of the service discovery function being executable to receive a discovery request from an NF, discover one or more NF instances from the plurality of NF instances based on at least one of a service, application, or subscription requirement obtained according to the discovery request, and respond to the discovery request with the one or more NF instances;
a second interface for interfacing with a segment routing (SR) path computation entity (SR-PCE); and
instructions of an SR path information obtaining function being executable to receive, from the SR-PCE via the second interface, SR path information associated with each SR path of one or more SR paths between each pair of a plurality of different pairs of NF instances which are candidate pairs for session communication, and store the SR path information for each SR path in association with at least one of the NF instances of a respective candidate pair, wherein the SR path information for each SR path includes one or more SR-PCE computed operational parameters of a respective SR path,
wherein the instructions of the service discovery function are further executable to discover the one or more NF instances from the plurality of NF instances based on identifying that the one or more SR-PCE computed operational parameters of the respective SR path associated with each of the one or more NF instances accords to the at least one service, application, or subscription requirement obtained according to the discovery request.

2. The NRF of claim 1, wherein the SR path information for each SR path includes the one or more SR-PCE computed operational parameters which comprise a latency parameter of a latency of the respective SR path.

3. The NRF of claim 1, wherein the SR path information for each SR path includes the one or more SR-PCE computed operational parameters which comprise a bandwidth parameter of a bandwidth of the respective SR path.

4. The NRF of claim 1, wherein the SR path information for each SR path includes the one or more SR-PCE computed operational parameters which comprise an operational status of the respective SR path.

5. The NRF of claim 1, wherein the SR path information for each SR path includes one or more Segment IDs (SIDs) or a SID list which defines the respective SR path.

6. The NRF of claim 1, wherein the plurality of NF instances comprise NF types which include one or more of an access and mobility management function (AMF), a session management function (SMF), and a user plane function (UPF).

7. The NRF of claim 1, wherein the plurality of NF instances comprise NF types associated with a radio access network (RAN) node such as a gNB.

8. The NRF of claim 1, wherein the instructions of the service discovery function are further executable to receive the discovery request in response to a message which indicates a request for creation or establishment of a session for a user equipment (UE), and wherein one of the one or more NF instances is selected for use in the session for the UE.

9. The NRF of claim 8, wherein the one of the one or more NF instances comprises a discovered User Plane Function (UPF) instance for the session for the UE.

10. The NRF of claim 8, wherein the at least one of the service, application, or subscription requirement is associated with the request for creation or establishment of the session for the UE.

11. The NRF of claim 1, wherein the service discovery function is further executable to respond to the discovery request with the SR path information for each SR path associated with each one of the one or more NF instances including the one or more SR-PCE computed operational parameters associated with each SR path.

12. The NRF of claim 11, wherein the plurality of NF instances comprise NF types which include one or more of an access and mobility management function (AMF), a session management function (SMF), and a user plane function (UPF).

13. A network function (NF) repository function (NRF) for a repository of information associated with a plurality of NF instances for a mobile network, the NRF being for use at a network node comprising one or more processors and memory for storing instructions that are executable by the one or more processors, the NRF comprising:
a first interface comprising an $N_{nrf}$ interface for a service discovery function;
instructions of the service discovery function being executable to receive a discovery request from an NF, discover one or more NF instances from the plurality of NF instances based on at least one of a service, application, or subscription requirement obtained according to the discovery request, and respond to the discovery request with the one or more NF instances;
a second interface for interfacing with a segment routing (SR) path computation entity (SR-PCE); and
instructions of an SR path information obtaining function being executable to receive, from the SR-PCE via the second interface, SR path information for each SR path of one or more SR paths between each pair of a plurality of different pairs of NF instances which are candidate pairs for session communication, and store the SR path information for each SR path in association with at least one of the NF instances of a respective candidate pair, wherein the SR path information for each SR path includes one or more SR-PCE computed operational parameters of a respective SR path,
wherein the instructions of the service discovery function are further executable to respond to the discovery request to include the SR path information for each SR path associated with each of the one or more NF instances including the one or more SR-PCE computed operational parameters of the respective SR path.

14. The NRF of claim 13, wherein the SR path information for each SR path includes one or more Segment IDs (SIDs) or a SID list which defines the respective SR path.

15. The NRF of claim 13, wherein the SR path information for each SR path includes the one or more SR-PCE computed operational parameters which comprise a latency parameter of a latency of the respective SR path.

16. The NRF of claim 13, wherein the SR path information for each SR path includes the one or more SR-PCE computed operational parameters which comprise a resiliency parameter of a resiliency of the respective SR path.

17. The NRF of claim 13, wherein the SR path information for each SR path includes the one or more SR-PCE computed operational parameters which comprise an operational status of the respective SR path.

18. A method comprising:
at a network function (NF) repository function (NRF) for use in a mobile network,
performing a service discovery function which includes receiving a discovery request from an NF, discovering one or more NF instances from a plurality of NF instances based on at least one of a service, application, or subscription requirement obtained according to the discovery request, and responding to the discovery request with the one or more NF instances; and
performing a function for obtaining segment route (SR) path information from a SR path computation entity (SR-PCE), which includes receiving SR path information associated with each SR path of one or more SR paths between each pair of a plurality of different pairs of NF instances which are candidate pairs for session communication, and storing the SR path information for each SR path in association with at least one of the NF instances of a respective candidate pair, wherein the SR path information for each SR path includes one or more SR-PCE computed operational parameters of a respective SR path.

19. The method of claim 18, wherein performing the service discovery function further includes discovering the one or more NF instances from the plurality of NF instances based on identifying that the one or more SR-PCE computed operational parameters of the respective SR path associated with each of the one or more NF instances accords to the at least one service, application, or subscription requirement obtained according to the discovery request.

20. The method of claim 18, wherein performing the service discovery function further includes responding to the discovery request to include the SR path information for each SR path associated with each of the one or more NF instances including the one or more SR-PCE computed operational parameters associated with the respective SR path.

* * * * *